US012651046B2

(12) United States Patent
Yoshimi et al.

(10) Patent No.: US 12,651,046 B2
(45) Date of Patent: Jun. 9, 2026

(54) CENTER APPARATUS, VEHICLE-SIDE SYSTEM, CONTENT PROTECTION METHOD, AND STORAGE MEDIUM STORING CONTENT PROTECTION PROGRAM

(71) Applicant: DENSO CORPORATION, Kariya-city (JP)

(72) Inventors: Hideo Yoshimi, Kariya-city (JP); Motomasa Futagami, Kariya-city (JP); Tomoya Ogawa, Kariya-city (JP); Masaaki Abe, Kariya-city (JP); Koto Tomatsu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 103 days.

(21) Appl. No.: 18/425,796

(22) Filed: Jan. 29, 2024

(65) Prior Publication Data

US 2024/0169076 A1 May 23, 2024

Related U.S. Application Data

(63) Continuation of application No. PCT/JP2022/028744, filed on Jul. 26, 2022.

(30) Foreign Application Priority Data

Aug. 6, 2021 (JP) ................................. 2021-129943

(51) Int. Cl.
| | |
|---|---|
| *H04L 29/06* | (2006.01) |
| *G06F 21/10* | (2013.01) |
| *G06F 21/60* | (2013.01) |

(52) U.S. Cl.
CPC ............ *G06F 21/10* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 9,026,781 B2 * | 5/2015 | Liu | ........................ | H04L 9/0827 713/150 |
| 2006/0085354 A1 * | 4/2006 | Hirai | ........................ | G06F 21/10 705/59 |
| 2009/0265539 A1 * | 10/2009 | Koyasu | ................. | H04L 9/0894 380/282 |
| 2011/0173454 A1 * | 7/2011 | Paley | .................... | H04L 9/0825 713/189 |

(Continued)

FOREIGN PATENT DOCUMENTS

| | | |
|---|---|---|
| JP | 2013088845 A | 5/2013 |
| JP | 2020027624 A | 2/2020 |

(Continued)

*Primary Examiner* — Shin-Hon (Eric) Chen
(74) *Attorney, Agent, or Firm* — Harness, Dickey & Pierce, PLC

(57) ABSTRACT

A center apparatus is configured to generate a content key for protecting content, generate a user key corresponding to a user who uses the content, manage a device key corresponding to each vehicle, encrypt the content using the content key, encrypt the content key using the device key; and encrypt a license file including at least a condition for using the content using the user key.

33 Claims, 23 Drawing Sheets

(56) References Cited

U.S. PATENT DOCUMENTS

| | | | | |
|---|---|---|---|---|
| 2013/0173923 A1* | 7/2013 | Qiu | H04L 63/0407 | 713/176 |
| 2013/0179689 A1* | 7/2013 | Matsumoto | G06F 8/61 | 713/168 |
| 2014/0359655 A1* | 12/2014 | Diehl | H04N 21/41407 | 725/31 |
| 2015/0026827 A1* | 1/2015 | Kao | G06F 21/125 | 726/29 |
| 2015/0186621 A1* | 7/2015 | Uy | G06F 21/109 | 726/26 |
| 2016/0127334 A1* | 5/2016 | Bangole | H04L 67/12 | 713/171 |
| 2016/0127895 A1* | 5/2016 | Bangole | H04W 4/48 | 380/279 |
| 2016/0364553 A1* | 12/2016 | Smith | H04L 63/0435 | |
| 2018/0212935 A1* | 7/2018 | Iyer | H04L 9/0822 | |
| 2019/0187971 A1* | 6/2019 | Wang | H04W 12/06 | |
| 2019/0261176 A1* | 8/2019 | Yamazaki | H04L 63/061 | |
| 2020/0050378 A1 | 2/2020 | Sakurai et al. | | |
| 2020/0050442 A1 | 2/2020 | Sakurai et al. | | |
| 2020/0177561 A1* | 6/2020 | Kruger | H04L 63/061 | |
| 2020/0183676 A1* | 6/2020 | Sakurai | H04L 67/34 | |
| 2020/0241771 A1 | 7/2020 | Sakurai et al. | | |
| 2021/0155176 A1 | 5/2021 | Harata et al. | | |
| 2021/0157529 A1 | 5/2021 | Sakurai et al. | | |
| 2021/0157566 A1 | 5/2021 | Sakurai et al. | | |
| 2021/0157567 A1 | 5/2021 | Sakurai et al. | | |
| 2021/0157568 A1 | 5/2021 | Sakurai et al. | | |
| 2021/0157571 A1 | 5/2021 | Ogawa et al. | | |
| 2021/0157572 A1 | 5/2021 | Harata et al. | | |
| 2021/0157575 A1 | 5/2021 | Ogawa et al. | | |
| 2021/0157902 A1 | 5/2021 | Sakurai et al. | | |
| 2021/0160064 A1* | 5/2021 | Harata | H04L 9/0891 | |
| 2022/0012043 A1 | 1/2022 | Sakurai et al. | | |
| 2022/0123923 A1* | 4/2022 | Patne | H04W 12/04 | |
| 2022/0242372 A1* | 8/2022 | Hamasaki | B60R 25/34 | |
| 2022/0284743 A1 | 9/2022 | Yoshimi et al. | | |
| 2023/0421571 A1* | 12/2023 | Wang | H04W 4/50 | |
| 2024/0311129 A1* | 9/2024 | Takahashi | H04L 9/0891 | |

FOREIGN PATENT DOCUMENTS

| | | |
|---|---|---|
| JP | 2020092289 A | 6/2020 |
| JP | 2022133732 A | 9/2022 |

* cited by examiner

FIG. 3

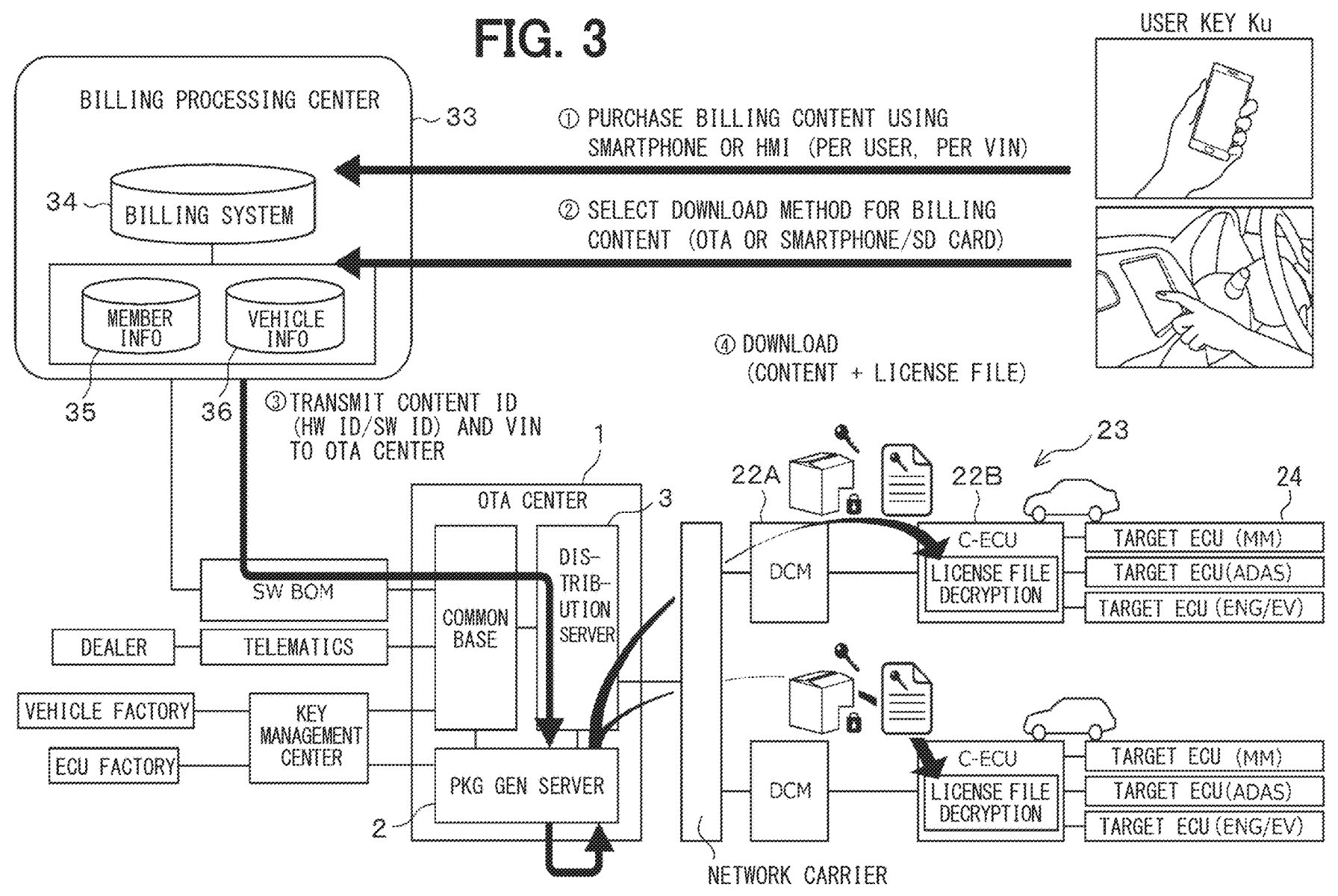

USER KEY Ku

① PURCHASE BILLING CONTENT USING SMARTPHONE OR HMI (PER USER, PER VIN)

② SELECT DOWNLOAD METHOD FOR BILLING CONTENT (OTA OR SMARTPHONE/SD CARD)

④ DOWNLOAD (CONTENT + LICENSE FILE)

33

BILLING PROCESSING CENTER

BILLING SYSTEM

34

VEHICLE INFO

MEMBER INFO

35

36

③ TRANSMIT CONTENT ID (HW ID/SW ID) AND VIN TO OTA CENTER

1

OTA CENTER

3

DIS-TRIB-UTION SERVER

COMMON BASE

PKG GEN SERVER

2

SW BOM

TELEMATICS

DEALER

KEY MANAGEMENT CENTER

VEHICLE FACTORY

ECU FACTORY

24

TARGET ECU (MM)

TARGET ECU (ADAS)

TARGET ECU (ENG/EV)

23

22B

C-ECU

LICENSE FILE DECRYPTION

22A

DCM

TARGET ECU (MM)

TARGET ECU (ADAS)

TARGET ECU (ENG/EV)

C-ECU

LICENSE FILE DECRYPTION

DCM

NETWORK CARRIER

FIG. 7

| | |
|---|---|
| CRYPTOGRAPHIC ALGORITHM | (SHARED KEY) AES/DES, (PUBLIC KEY) RSA/ECC |
| SIGNATURE ALGORITHM | (SHARED KEY) CBC-MAC, C-MAC, (PUBLIC KEY) DSA |
| KEY ID | USED TO IDENTIFY KEY |
| ENCRYPTION MODE | ENC THEN MAC, MAC THEN ENC, ENC AND MAC, ETC. |
| ENCRYPTION/SIGNATURE TARGET | CAN SPECIFY CERTAIN FILES OR DATA (SUCH AS PROTECT ONLY AUTOMATED-DRIVE-ON.DAT IN ZIP) |
| SELECT AREA SPECIFICATION | WHOLE FILE OR RANGE SPECIFICATION |
| OFFSET SIZE | SPECIFY NUMBER OF BYTES FROM BEGINNING TO BE PROTECTED (IN CASE OF RANGE SPECIFICATION) |
| PROTECTED DATA SIZE | SPECIFY HOW MANY BYTES TO BE PROTECTED (IN CASE OF RANGE SPECIFICATION) |

FIG. 8

· REPROGRAMMING POLICY METADATA

| | |
|---|---|
| 1. REPROGRAMMING POLICY METADATA VERSION | : 1.0.0/2.0.0/··· |
| 2. DISTRIBUTION LAYER<br> 1. COMMUNICATION PROTOCOL :  Uptane/OMA-DM/SSL/···none<br> 2. COMMUNICATION METHOD  :  CELLULAR/SMARTPHONE/USB MEMORY | |
| 3. MASTER LAYER (ONE OR MORE)<br>  1. PF          : AP/CP/AGL/Android/···<br>  2. CONTROL METHOD    : PARAMETER/SCRIPT | |
| 4. TARGET LAYER (ONE OR MORE)<br>  1. PF          : AP/CP/AGL/Android/···<br>  2. TRANSFER METHOD   : STORAGE METHOD/ STREAMING METHOD<br>  3. CONTROL METHOD    : PARAMETER/SCRIPT<br>  4. BILLING METHOD    : CHARGED/FREE<br>  5. Target ID      :  (OPTION) | |
|   1. PF          : AP/CP/AGL/Android/···<br>  2. TRANSFER METHOD   : STORAGE METHOD/ STREAMING METHOD<br>  3. CONTROL METHOD    : PARAMETER/SCRIPT<br>  4. BILLING METHOD    : CHARGED/FREE<br>  5. Target ID      :  (OPTION) | |

FIG. 9

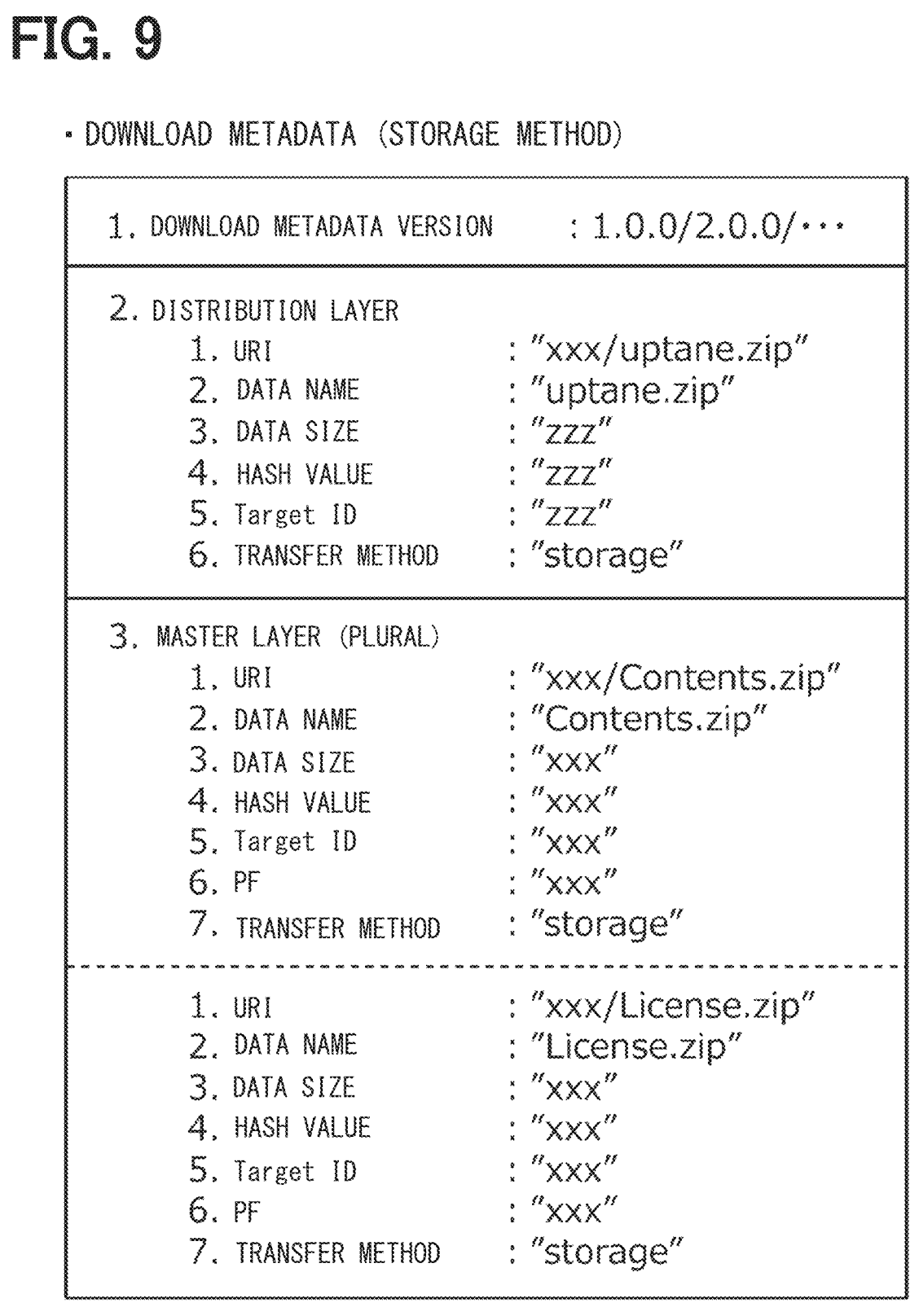

· DOWNLOAD METADATA (STORAGE METHOD)

1. DOWNLOAD METADATA VERSION    : 1.0.0/2.0.0/···

2. DISTRIBUTION LAYER
     1. URI                 : "xxx/uptane.zip"
     2. DATA NAME        : "uptane.zip"
     3. DATA SIZE         : "zzz"
     4. HASH VALUE       : "zzz"
     5. Target ID         : "zzz"
     6. TRANSFER METHOD   : "storage"

3. MASTER LAYER (PLURAL)
     1. URI                 : "xxx/Contents.zip"
     2. DATA NAME        : "Contents.zip"
     3. DATA SIZE         : "xxx"
     4. HASH VALUE       : "xxx"
     5. Target ID         : "xxx"
     6. PF                  : "xxx"
     7. TRANSFER METHOD   : "storage"

1. URI                 : "xxx/License.zip"
     2. DATA NAME        : "License.zip"
     3. DATA SIZE         : "xxx"
     4. HASH VALUE       : "xxx"
     5. Target ID         : "xxx"
     6. PF                  : "xxx"
     7. TRANSFER METHOD   : "storage"

FIG. 10

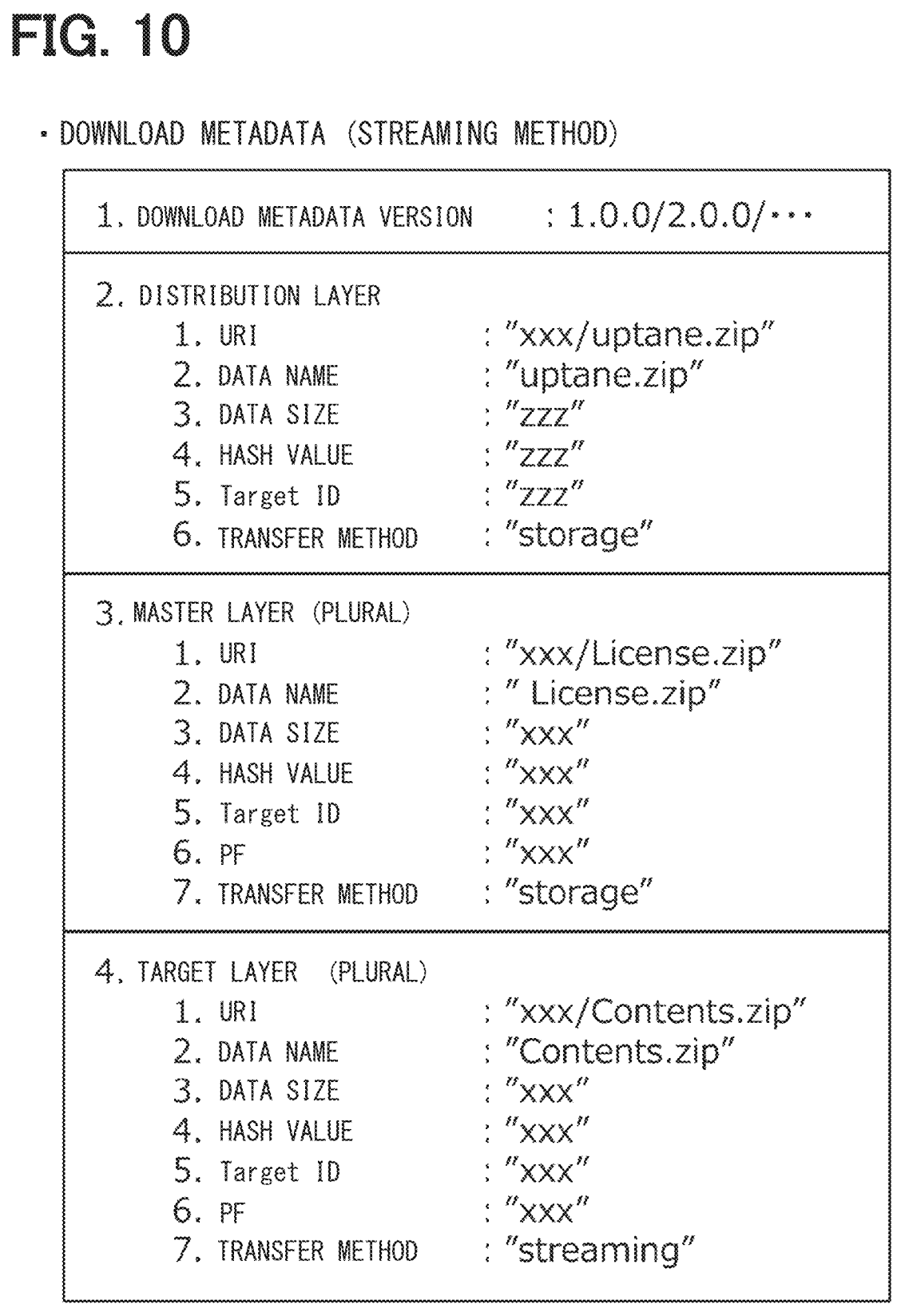

- DOWNLOAD METADATA (STREAMING METHOD)

1. DOWNLOAD METADATA VERSION     : 1.0.0/2.0.0/···

2. DISTRIBUTION LAYER
    1. URI                    : "xxx/uptane.zip"
    2. DATA NAME              : "uptane.zip"
    3. DATA SIZE              : "zzz"
    4. HASH VALUE             : "zzz"
    5. Target ID              : "zzz"
    6. TRANSFER METHOD        : "storage"

3. MASTER LAYER (PLURAL)
    1. URI                    : "xxx/License.zip"
    2. DATA NAME              : " License.zip"
    3. DATA SIZE              : "xxx"
    4. HASH VALUE             : "xxx"
    5. Target ID              : "xxx"
    6. PF                     : "xxx"
    7. TRANSFER METHOD        : "storage"

4. TARGET LAYER   (PLURAL)
    1. URI                    : "xxx/Contents.zip"
    2. DATA NAME              : "Contents.zip"
    3. DATA SIZE              : "xxx"
    4. HASH VALUE             : "xxx"
    5. Target ID              : "xxx"
    6. PF                     : "xxx"
    7. TRANSFER METHOD        : "streaming"

FIG. 17

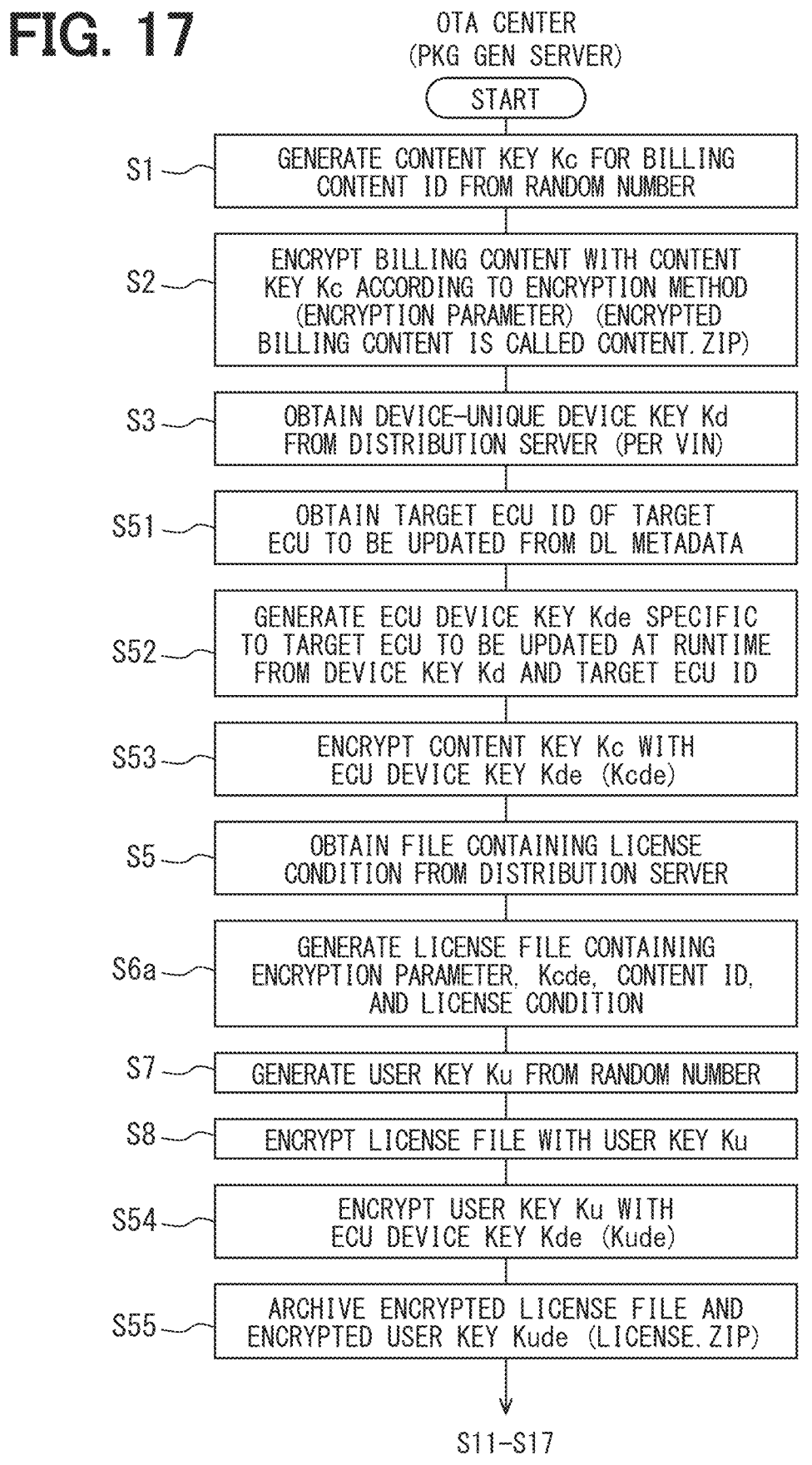

OTA CENTER
(PKG GEN SERVER)

( START )

S1 — GENERATE CONTENT KEY Kc FOR BILLING CONTENT ID FROM RANDOM NUMBER

S2 — ENCRYPT BILLING CONTENT WITH CONTENT KEY Kc ACCORDING TO ENCRYPTION METHOD (ENCRYPTION PARAMETER) (ENCRYPTED BILLING CONTENT IS CALLED CONTENT.ZIP)

S3 — OBTAIN DEVICE-UNIQUE DEVICE KEY Kd FROM DISTRIBUTION SERVER (PER VIN)

S51 — OBTAIN TARGET ECU ID OF TARGET ECU TO BE UPDATED FROM DL METADATA

S52 — GENERATE ECU DEVICE KEY Kde SPECIFIC TO TARGET ECU TO BE UPDATED AT RUNTIME FROM DEVICE KEY Kd AND TARGET ECU ID

S53 — ENCRYPT CONTENT KEY Kc WITH ECU DEVICE KEY Kde (Kcde)

S5 — OBTAIN FILE CONTAINING LICENSE CONDITION FROM DISTRIBUTION SERVER

S6a — GENERATE LICENSE FILE CONTAINING ENCRYPTION PARAMETER, Kcde, CONTENT ID, AND LICENSE CONDITION S7 — GENERATE USER KEY Ku FROM RANDOM NUMBER S8 — ENCRYPT LICENSE FILE WITH USER KEY Ku S54 — ENCRYPT USER KEY Ku WITH ECU DEVICE KEY Kde (Kude)

S55 — ARCHIVE ENCRYPTED LICENSE FILE AND ENCRYPTED USER KEY Kude (LICENSE.ZIP)

S11-S17

CONTENT KEY Kc = PER CONTENT (AES)

USER KEY Ku = VIN OR PERSON (AES)

DEVICE KEY Kdt = TARGET ECU_ID (RSA)

FIG. 21

OTA CENTER
(PKG GEN SERVER)

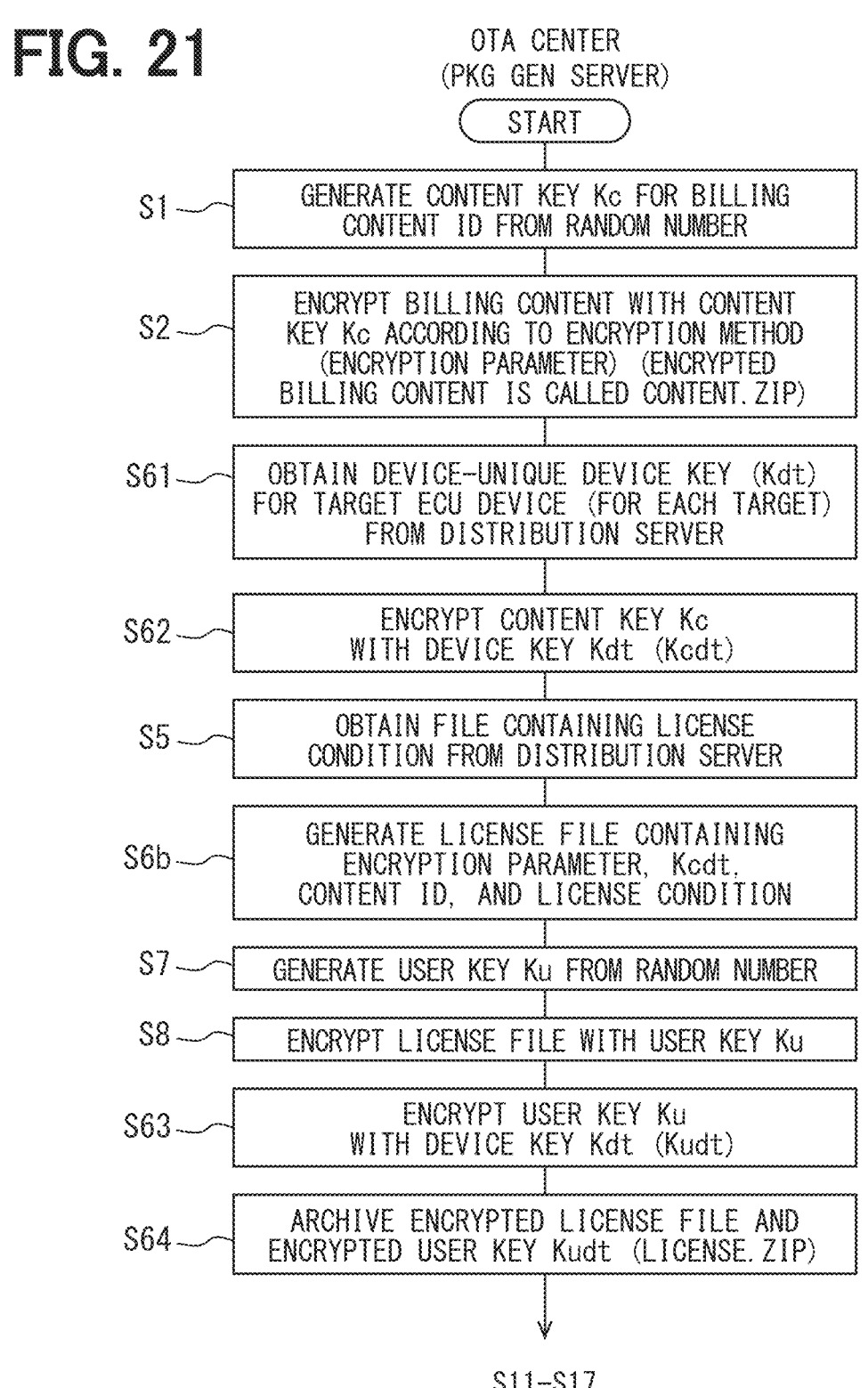

START

S1 — GENERATE CONTENT KEY Kc FOR BILLING CONTENT ID FROM RANDOM NUMBER

S2 — ENCRYPT BILLING CONTENT WITH CONTENT KEY Kc ACCORDING TO ENCRYPTION METHOD (ENCRYPTION PARAMETER) (ENCRYPTED BILLING CONTENT IS CALLED CONTENT.ZIP)

S61 — OBTAIN DEVICE-UNIQUE DEVICE KEY (Kdt) FOR TARGET ECU DEVICE (FOR EACH TARGET) FROM DISTRIBUTION SERVER

S62 — ENCRYPT CONTENT KEY Kc WITH DEVICE KEY Kdt (Kcdt)

S5 — OBTAIN FILE CONTAINING LICENSE CONDITION FROM DISTRIBUTION SERVER

S6b — GENERATE LICENSE FILE CONTAINING ENCRYPTION PARAMETER, Kcdt, CONTENT ID, AND LICENSE CONDITION S7 — GENERATE USER KEY Ku FROM RANDOM NUMBER S8 — ENCRYPT LICENSE FILE WITH USER KEY Ku S63 — ENCRYPT USER KEY Ku WITH DEVICE KEY Kdt (Kudt)

S64 — ARCHIVE ENCRYPTED LICENSE FILE AND ENCRYPTED USER KEY Kudt (LICENSE.ZIP)

S11-S17

CENTER APPARATUS, VEHICLE-SIDE SYSTEM, CONTENT PROTECTION METHOD, AND STORAGE MEDIUM STORING CONTENT PROTECTION PROGRAM

CROSS REFERENCE TO RELATED APPLICATIONS

The present application is a continuation application of International Patent Application No. PCT/JP2022/028744 filed on Jul. 26, 2022 which designated the U.S. and claims the benefit of priority from Japanese Patent Application No. 2021-129943 filed on Aug. 6, 2021. The entire disclosures of all of the above applications are incorporated herein by reference.

TECHNICAL FIELD

The present disclosure relates to a center apparatus that distributes content to vehicles, a vehicle-side system that communicates with the center apparatus, a content protection method, and a content protection program.

BACKGROUND

A related art discloses a technique in which an update program of an ECU is distributed from a server to an automotive apparatus by OTA (Over The Air), and the update program is rewritten on the vehicle side.

SUMMARY

A center apparatus is configured to generate a content key for protecting content, generate a user key corresponding to a user who uses the content, manage a device key corresponding to each vehicle, encrypt the content using the content key, encrypt the content key using the device key; and encrypt a license file including at least a condition for using the content using the user key.

BRIEF DESCRIPTION OF DRAWINGS

The above object and other objects, features, and advantages of the present disclosure will become more apparent from the following detailed description with reference to the accompanying drawings. The drawings include:

FIG. 3 is a diagram for illustrating a usage case of paid content;

FIG. 7 is a diagram showing an example of an encryption parameter;

FIG. 8 is a diagram showing an example of reprogramming policy metadata;

FIG. 9 is a diagram showing an example of download metadata corresponding to a storage method;

FIG. 10 is a diagram showing an example of download metadata corresponding to a streaming method;

FIG. 17 is a flowchart showing processing performed by the OTA center;

FIG. 21 is a flowchart showing processing performed by the OTA center;

DETAILED DESCRIPTION

Figure 1:
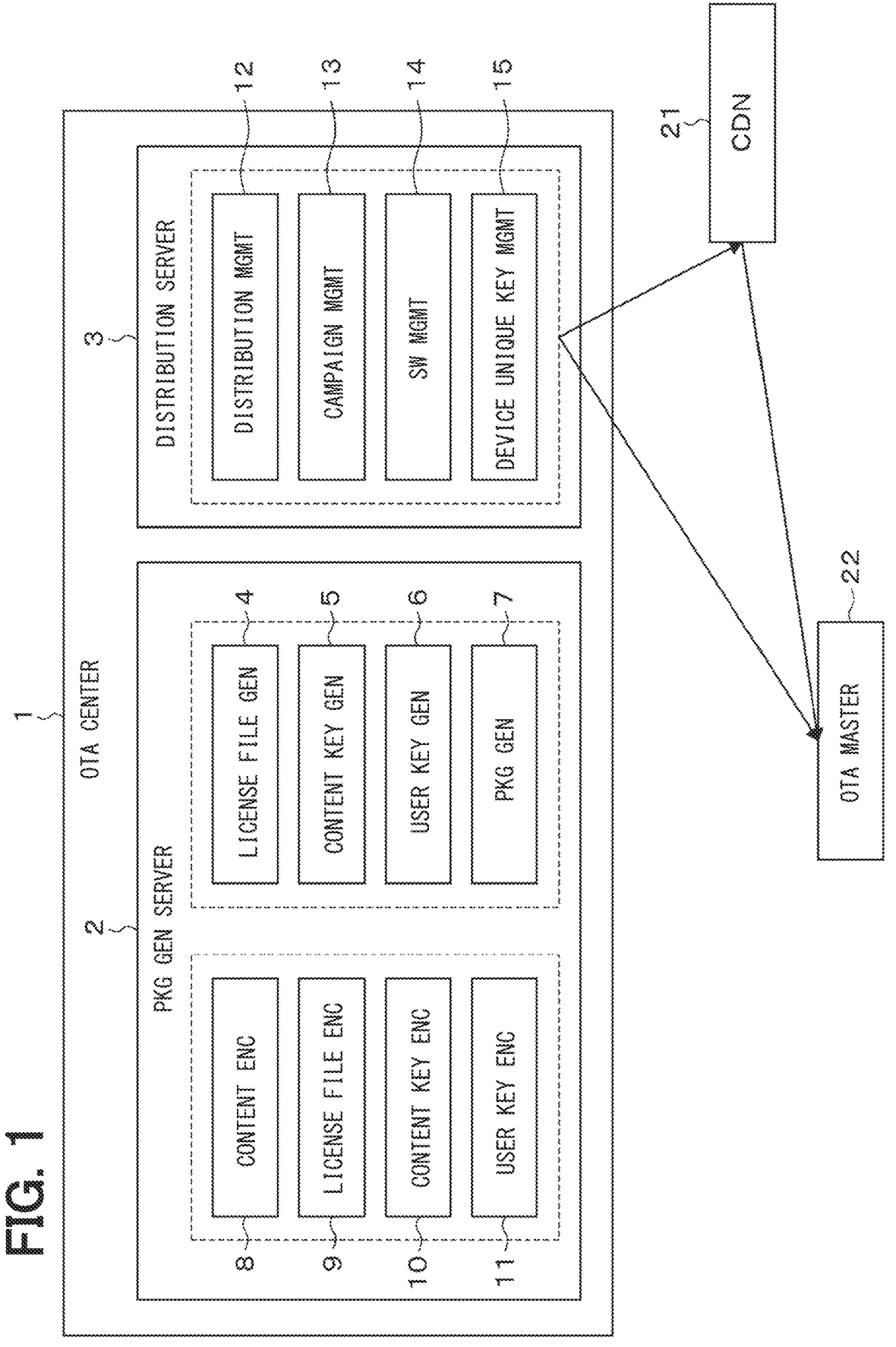
FIG. 1 is a functional block diagram mainly showing an OTA center in a first embodiment.

In recent years, with diversification of vehicle control such as a driving support function and an automated driving function, a scale of application programs for vehicle control, diagnosis, and the like mounted on an electronic control apparatus (hereinafter, referred to as an electronic control unit (ECU)) of a vehicle has been increasing. In addition, with the version up by function improvement or the like, there has also been an increasing opportunity to perform what is called reprogramming in which the application program of the ECU is rewritten. On the other hand, with the progress or the like of communication networks, connected car technology has also become widespread. A related art discloses a technique in which an update program of an ECU is distributed from a server to an automotive apparatus by OTA (Over The Air), and the update program is rewritten on the vehicle side.

In addition, not only the update program but also digital content that can be used by users for a fee is similarly distributed to the apparatus by OTA. The content whose use is restricted as described above is referred to as paid content. In a currently operated system, all software, regardless of paid content or other content, is distributed to a vehicle. The user who uses the paid content performs billing through a predetermined procedure, thereby enabling the billing flag managed by the center which is the content distribution source. The vehicle to which the paid content is distributed inquires of the center, and as long as the billing flag is enabled, the paid content becomes available.

In the current system, it is assumed that the billing status is inquired of the center. Therefore, the paid content cannot be made available unless the vehicle is in a communicable state with the center.

The present disclosure provides a center apparatus that can use content the use of which is restricted in a more flexible form, a vehicle-side system that communicates with the center apparatus, a content protection method, and a content protection program.

According to the center apparatus according to one aspect of the present disclosure, the content key generation section generates a content key for protecting content on which use restriction can be imposed when in use, and the user key generation section generates a user key corresponding to a user of the content. The content encryption section encrypts the content using the content key, and the content key encryption section encrypts the content key using the device key corresponding to each vehicle. The file encryption section encrypts the license file including at least a condition for using the content using the user key.

With this configuration, since the center apparatus only needs to manage the device keys corresponding to the respective vehicles, the number of keys to be managed is reduced. In addition, the content on which the use restriction can be imposed is protected by the content key, and in order to use the content key, the user key associated with the user of the content and the device key associated with each vehicle are required. That is, the content is protected by the double keys. When the content on which use restriction is imposed is used on the vehicle side, a procedure satisfying the use condition only needs to be performed in advance, and necessary decryption only needs to be sequentially performed on the vehicle side using the device key.

Therefore, the center apparatus can flexibly and reliably protect the content on which use restriction is imposed. In addition, by using the license file, it is possible to flexibly set a condition for using the content. In addition, on the vehicle side, content can be used even when communication with the center apparatus is not possible.

According to the center apparatus according to one aspect of the present disclosure, since the user key encryption section encrypts the user key using the device key, the content is protected by the triple keys, and the protection level of the content can be further improved.

According to the center apparatus according to one aspect of the present disclosure, the license file includes: a license condition for using the content, a content key encrypted using the device key, and identification information for identifying the content. Accordingly, when the license file is decrypted using the user key, the license condition for using the content can be checked. When the content key is decrypted using the device key after the license condition is satisfied, the content corresponding to the identification information can be decrypted using the key.

According to the center apparatus according to one aspect of the present disclosure, the license file further includes an encryption parameter that is information for performing encryption. Accordingly, detailed information regarding encryption performed using each key can be obtained from the license file.

First Embodiment

As shown in FIG. 1, the OTA center 1 of the present embodiment, which is a center apparatus, includes a PKG generation server 2 and a distribution server 3. The PKG generation server 2 roughly includes a functional portion that generates a key, a data package, and the like used for encryption and a functional portion that performs encryption and signature. The former includes a license file generation function section 4, a content key generation function section 5, a user key generation function section 6, and a PKG generation function section 7. In addition, the latter includes a content encryption function section 8, a license file encryption function section 9, a content key encryption function section 10, and a user key encryption function section 11. "PKG" means "package".

The content key generation function section 5 generates a content key Kc corresponding to the ID that is the identification information of the billing target content by, for example, random numbers. Hereinafter, the billing target content is referred to as "paid content". The user key generation function section 6 generates a user key Ku corresponding to the user of the paid content by, for example, random numbers. The license file generation function section 4 generates a license file in which the ID of the paid content, the content key Kc, a license condition for using the paid content, and the like are stored. The PKG generation function section 7 generates a distribution package including encrypted paid content or the like. Conditioning that billing is performed when the user uses the content is one mode of restricting the use.

The paid content includes a case where the content itself is billed and a case of conditioning that a part of the content is billed as with in-app purchases. The content means, for example, an application, data used by the application, or a service provided to the occupant via the application. Therefore, the content is, for example, a video or music viewed in the vehicle interior, a game application, a vehicle control application related to vehicle control, map data, a navigation application, the use authority of a service, and the like.

The content encryption function section 8 encrypts the paid content using the content key Kc according to a predetermined encryption method. The content key encryption function section 10 encrypts the content key Kc using the device key Kd. The user key encryption function section 11 encrypts the user key Ku similarly using the device key Kd. The license file encryption function section 9 encrypts the license file using the user key Ku.

The distribution server 3 includes a distribution management function section 12, a campaign management function section 13, a software management function section 14, and a device unique key management function section 15. The device unique key management function section 15 manages a device key Kd uniquely assigned corresponding to identification information assigned to each vehicle such as a vehicle identification number (VIN). The software management function section 14 manages software such as paid content together with an ID. The campaign management function section 13 manages campaign information which is information related to program updates including paid content and the like. The distribution management function section 12 distributes the distribution package or the like generated by the PKG generation function section 7 to the OTA master 22 on the vehicle side via a communication carrier, a contents delivery network (CDN) 21, or the like.

Figure 2:
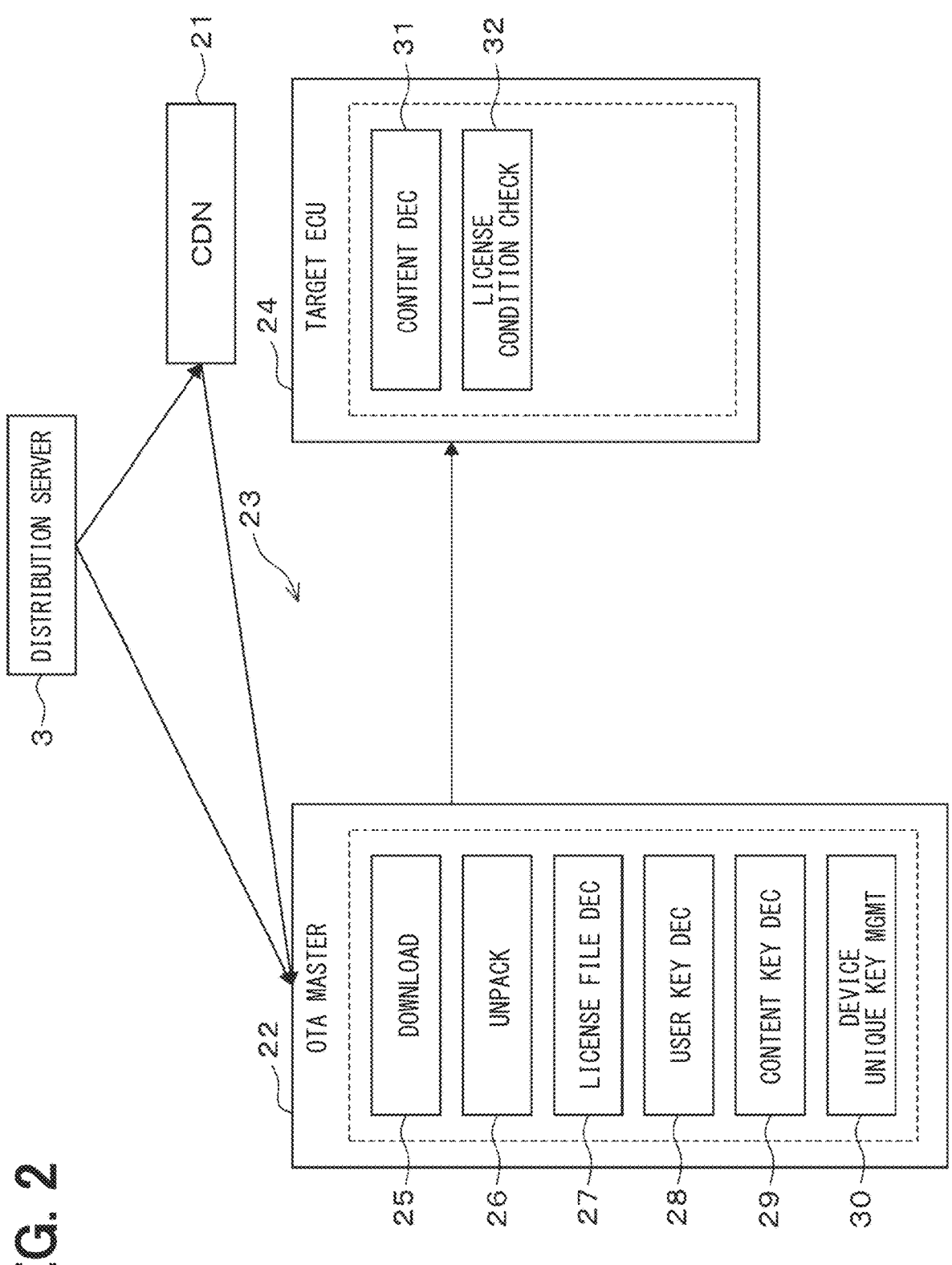
FIG. 2 is a functional block diagram mainly showing a vehicle-side system.

As shown in FIG. 2, the vehicle-side system 23 includes an OTA master 22 and a target ECU 24. The OTA master 22 includes a data communication module (DCM) 22A shown in FIG. 3 which communicates with the distribution server 3 and the like, and a central ECU 22B that communicates with the target ECU 24. The OTA master 22 includes a download function section 25, an unpack function section 26, a license file decryption function section 27, a user key decryption function section 28, a content key decryption function section 29, and a device unique key management function section 30.

The download function section 25 performs communication with the distribution server 3 of the OTA center 1 directly or via the CDN 21 to download a data file, a package, or the like. When the received data package is a compressed file, the unpack function section 26 unpacks the data package to extract necessary data. In the device unique key management function section 30, a device key Kd corresponding to the VIN of the vehicle has been written at the manufacturing stage. The user key decryption function section 28 decrypts the user key Ku using the device key Kd. The license file decryption function section 27 decrypts the license file using the user key Ku. The content key decryption function section 29 decrypts the content key Kc using the device key Kd.

The OTA master 22 transfers the encrypted data package including the content, and the license file to the target ECU 24. One or more target ECUs 24 are present, and include a content decryption function section 31 and a license condition check function section 32. The license condition check function section 32 checks whether the license condition of the content included in the license file is satisfied. When the license condition is satisfied, the content decryption function section 31 decrypts the content using the content key Kc included in the license file.

Each of the functional blocks in the OTA center 1 and the OTA master 22 described above is implemented in cooperation with computer hardware and software.

How the respective function sections of the OTA master 22 are functionally shared between the DCM 22A and the central ECU 22B is not particularly limited. The central ECU 22B may have some or all of the functions of the OTA master 22, or the DCM 22A may have some or all of the functions of the OTA master 22. That is, in the OTA master 22, function sharing between the DCM 22A and the central ECU 22B may be configured in any manner. The OTA master 22 may include two ECUs of the DCM 22A and the central ECU 22B, or may include one integrated ECU having the functions of the DCM 22A and the central ECU 22B.

As shown in FIG. 3, when using the paid content, the user communicates with the billing processing center 33 through a smartphone or the human machine interface (HMI) of the vehicle-side system 23. The billing processing center 33 includes a billing system 34, a membership information database 35, a vehicle information database 36, and the like. When performing the procedure of purchasing the paid content, the user selects a method of downloading the paid content. For example, whether to download to the OTA master 21 or download to a smartphone or an SD card is selected. The SD card corresponds to an example of an external storage medium.

The billing processing center 33 transmits the ID of the paid content purchased by the user and the VIN of the corresponding vehicle to the OTA center 1. The OTA center 1 encrypts the paid content and the license file as described above, and causes the vehicle-side system 23 to download these if the download method is "OTA". The "network carrier" in the figure includes a case where communication is performed with the distribution server 3 directly or via the CDN 21. In the figure, the OTA master 22 is shown as the DCM 22A and the C-ECU 22B.

In the OTA center 1, when receiving the ID of the paid content purchased by the user and the VIN of the corresponding vehicle, the billing processing center 33 encrypts the paid content and the license file. In addition, the PKG generation server 2 makes a push notification to, for example, the DCM 22A of the vehicle-side system 23. The DCM 22A is configured to receive a push notification even when the ignition is turned off. Therefore, the DCM 22A receives the push notification from the OTA center 1 regardless of the state of the ignition. This push notification triggers the OTA master 22 to synchronize the vehicle configuration information with the OTA center 1.

Figure 4:
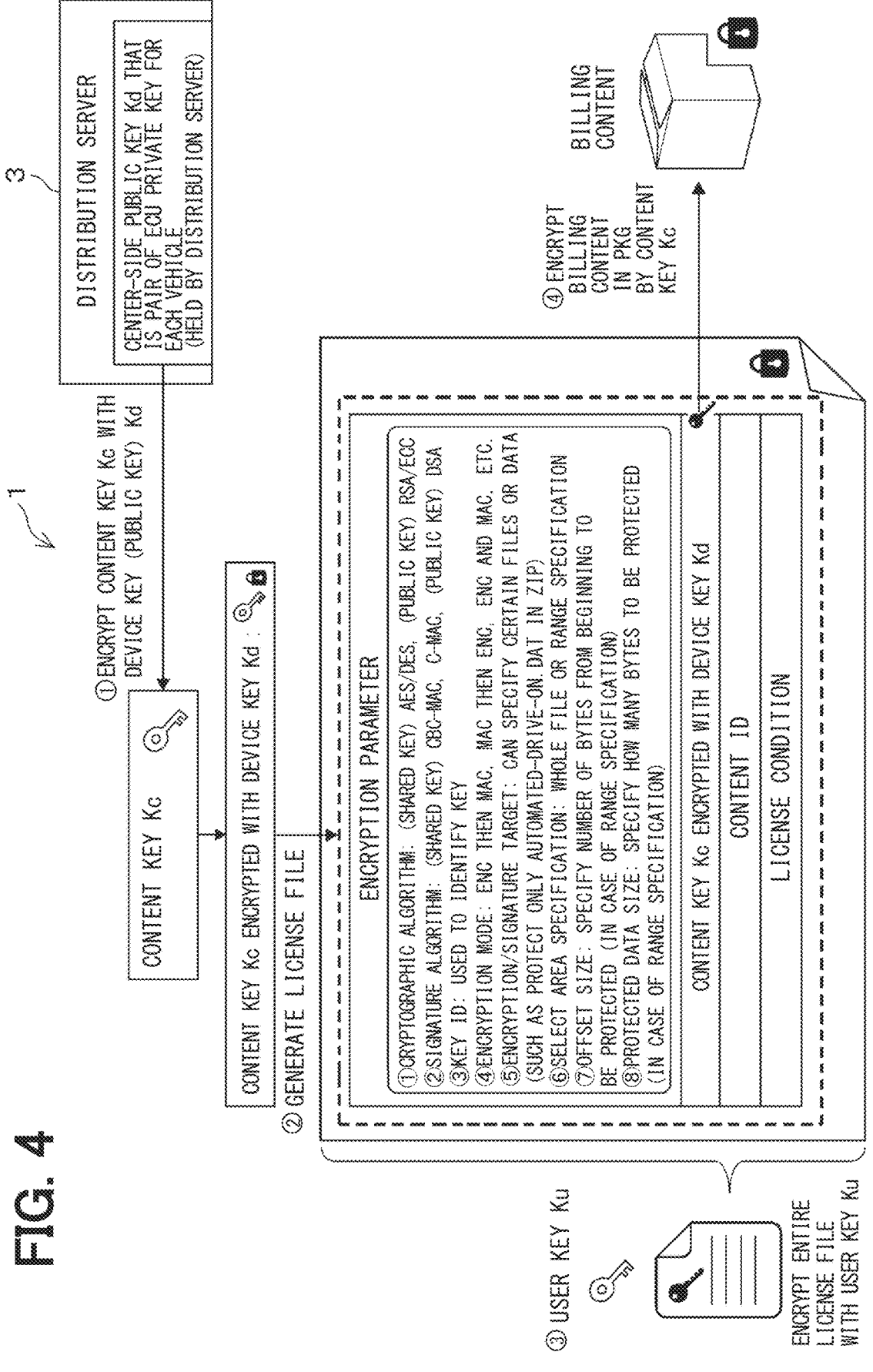
FIG. 4 is a diagram conceptually showing processing performed on the OTA center side.
Figure 5:
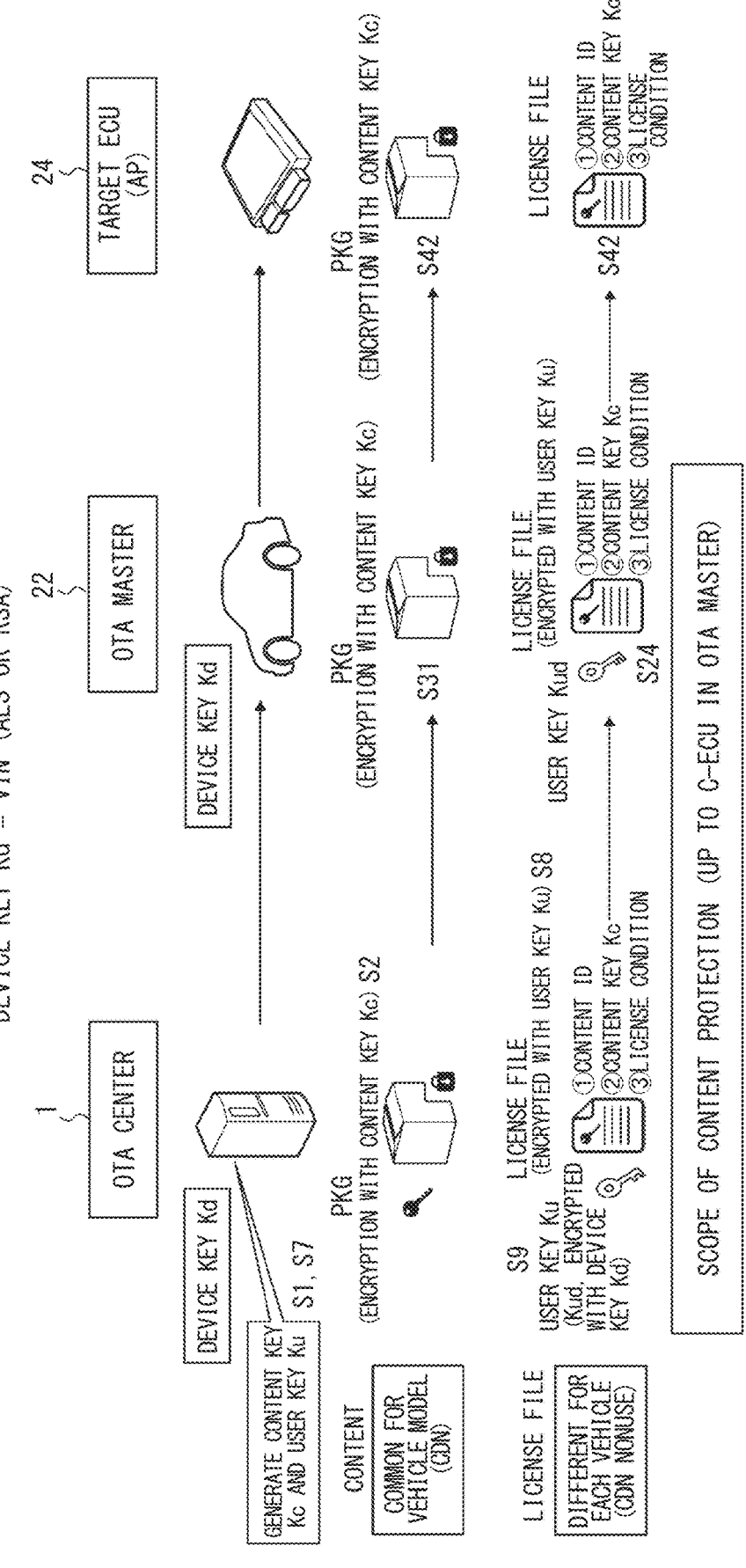
FIG. 5 is a diagram conceptually showing processing performed among an OTA center, an OTA master, and a target ECU.

As shown in FIG. 4, the license file generated by the OTA center includes an encryption parameter together with a content key Kc encrypted with the device key Kd, an ID of the paid content, and a license condition. The license condition includes the billing processing being completed, the use period of the paid content, the remaining number of uses, or the transfer to another vehicle being disabled, for example. The encryption parameter shown in FIG. 7 is a parameter related to encryption and digital signature. The encryption parameter includes an encryption parameter related to the content key Kc and an encryption parameter related to the user key Ku.

Encryption type information: (Common key) Advanced Encryption Standard (AES), Triple-DES (Data Encryption Standard), (Public key) RSA (Rivest-Shamir-Adleman cryptosystem), ECC (Elliptic Curve Cryptography)

Signature type information: (Common key) CBC-MAC (Message Authentication Code), CMAC (Common MAC) (Public Key) Digital Signature Algorithm (DSA), ECDSA (Elliptic Curve DSA)

Key ID information: used to identify a key

Figure 6:
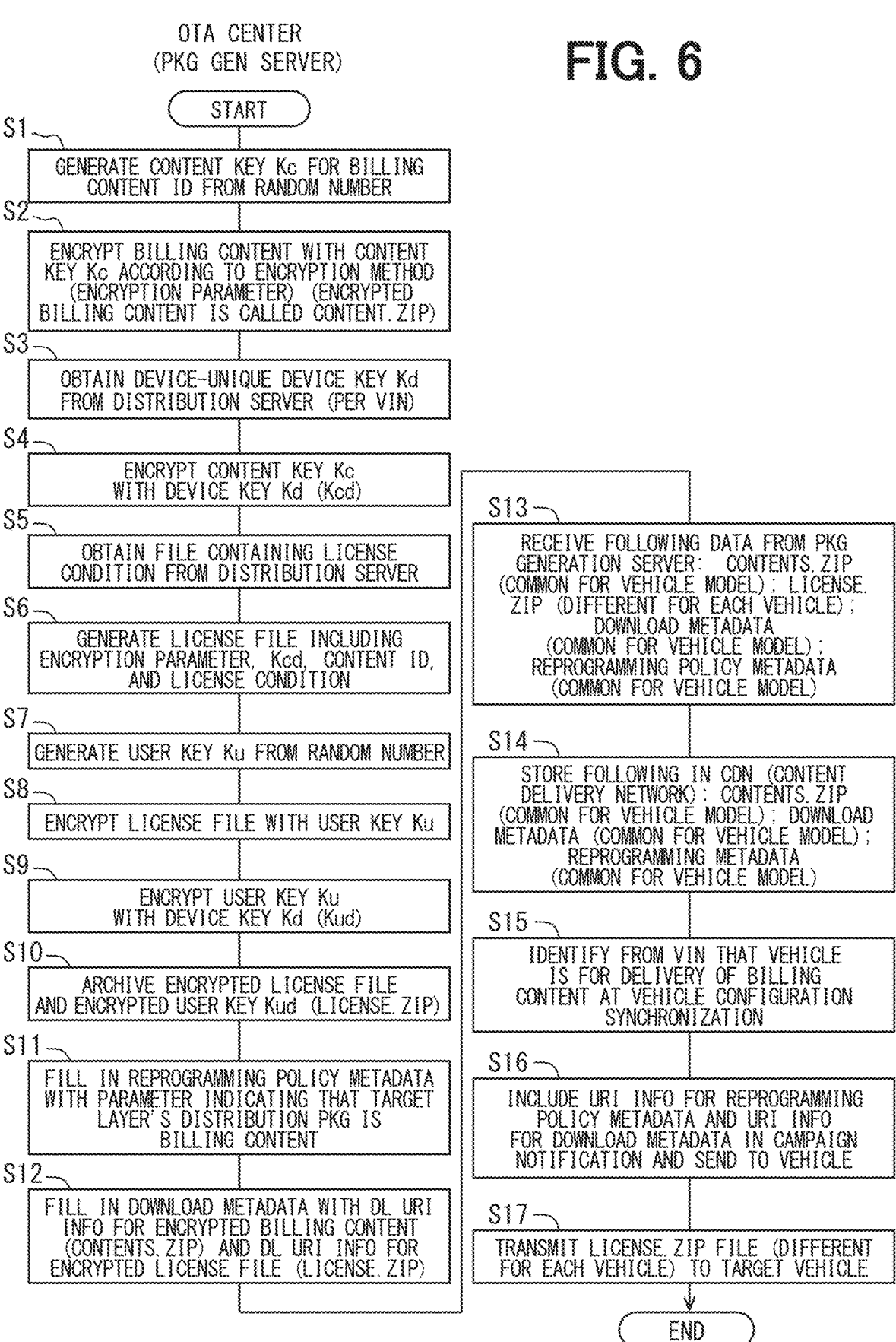
FIG. 6 is a flowchart showing processing performed by the OTA center.

Encryption mode type information: Enc (Encrypt) then MAC, MAC then ENC, ENC and MAC Protection target information: Specify specific file or data Protection area designation information: Specify the whole or a part of the file Offset size information: Specify from what number of byte from the beginning to protect Protection data size information: Specify how many bytes to protect Next, the action of the present embodiment will be described. As shown in FIG. 6, when generating the content key Kc corresponding to the ID of the billing target content by random numbers (S1), the PKG generation server 2 of the OTA center 1 encrypts the paid content using the content key Kc according to a predetermined encryption method (S2). Let the file name of the encrypted paid content be Contents.zip. Subsequently, when the device key Kd is acquired from the distribution server 3 (S3), the content key Kc is encrypted using the device key Kd (S4). Let the encrypted content key Kc be Kcd.

Next, when the file in which the license condition of the paid content is described is acquired from the software management function section 14 of the distribution server 3 (S5), a license file including the encryption parameter, the content key Kcd, the content ID, and the license condition is generated (S6). When the user key Ku is generated by random numbers (S7), the license file is encrypted using the user key Ku (S8), and the user key Ku is encrypted using the device key Kd (S9). Let the encrypted user key Ku be Kud. The encrypted license file and user key Kud are archived (S10). Let the file name be Licence.zip.

Then, a parameter indicating that the distribution package of the target layer is the paid content is embedded in the reprogramming policy metadata (S11), and the uniform resource identifier (URI) information for downloading the file Contents.zip of the paid content and the URI information for downloading the license file Licence.zip are embedded in the download metadata (S12).

Here, the reprogramming policy metadata and the download metadata will be described. Hereinafter, the former is referred to as RP metadata, and the latter is referred to as DL metadata. The RP metadata is information including configuration information on the distribution package, in other words, information indicating a configuration type of the package, and is information mainly focused on preventing an error in the distribution of the package by checking the content of the data on the vehicle side. In addition, the DL metadata stores control information for acquiring data, in other words, is information defining contents for enabling the OTA master 22 to grasp information for downloading update data for each of the ECUs 24 to be a plurality of targets. By forming these pieces of metadata into a three-layer structure of distribution, master, and target, even when the types of the transfer method and platform, and the types of distribution packages increase, it is possible to flexibly define and cope with them, and it is possible to update data of the target apparatus.

«Reprogramming Policy Metadata»

The RP metadata shown in FIG. 8 is transmitted from the OTA center 1 to the OTA master 22 before the download of the distribution package.

<RP Metadata Version>

It is a version of the RP metadata, and version information such as "1.0.0" or "2.0.0" is stored.

<Communication Layer>

Information indicating a protocol used for communication with the OTA center 1, for example, Uptane (registered trademark), Open Mobile Alliance-Device Management (OMA-DM), or the like, and information that the communication means is a "cellular phone", a smartphone, a USB memory, or the like to be described below which indicate the OTA master 22 are stored.

<Master Layer>

Information indicating that the platform (PF) of the OTA master 22 is, for example, AP, CP, Automotive Grade Linux (AGL), or Android (registered trademark) is stored. Regarding a package structure for distributing an update program according to a platform of an ECU, in a specification of JASPAR, data requirements applicable to a classic platform (CP) operating on a static OS of a standardization body AUTOSAR are specified. In addition, in AUTOSAR, data requirements applicable to a new type of adaptive platform (AP) operating on a dynamic OS are specified. AGL stands for Automotive Grade Linux (registered trademark), and Android stands for Android Automotive OS.

Here, a difference between the AP and the CP will be described. The AP and the CP represent a software platform. The software platform is also referred to as a software architecture. CP represents the AUTOSAR Classic Platform and AP represents the AUTOSAR Adaptive Platform. Furthermore, an ECU that operates in accordance with the CP specification may be referred to as a CP ECU or an ECU of a CP, and an ECU that operates in accordance with the AP specification may be referred to as an AP ECU or an ECU of an AP.

In the AP and the CP, an operating system to be used, what is called an OS, and a development language are different. The CP ECU and the AP ECU have different receivable package structures. The difference in the structure of these packages is mainly caused by a difference in processing performance of the ECU, and since the processing performance of the ECU of the CP is generally low, specification data and the like included in the package are also described as binary data, and the package data structure is easy to interpret and process even by the ECU with low processing performance.

On the other hand, since an ECU having high processing performance is used for the AP ECU, it is possible to install a parser function that analyzes structural character data described in a language of some kind and converts the structural character data into a data structure that can be handled by a program, and the data structure can adopt an object-oriented data format such as JavaScript Object Notation (JSON) rather than simple binary data, and thus a flexible package data structure is obtained.

Regarding the control method, information is stored such as a "parameter" to be processed according to a parameter set according to a specific format, or a "script" to be processed in a more free description format without a specific format.

<Target Layer>

It is information corresponding to the target ECU 33. The PF and the control method are similar to those described above. The transfer method is any one of storage and streaming. The billing method indicates whether the use of the content is paid or free. The target ID is an ID corresponding to the target ECU 24, but it is optional to store the target ID here.

«Download Metadata»

The DL metadata shown in FIGS. 9 and 10 is transmitted from the OTA center 1 to the OTA master 22 following the RP metadata. The respective figures show cases where the transfer method is storage and streaming.

<Distribution Layer>

For example, when the communication protocol is Uptane, it is information for acquiring Uptane metadata, and a URI, a data name, a data size, a hash value, a target ID, a transfer method, and the like corresponding thereto are stored.

<Master/Target Layer>

In the case of the streaming method shown in FIG. 10, the master layer is information for acquiring the license file Licence.zip, and the target layer is information for acquiring the content file Contents.zip. On the other hand, in the case of the storage method shown in FIG. 9, since information for acquiring both files is embedded in the master layer, the target layer is not essential. The target layer may be provided, but the information is null or blank. Each item is similar to that of the distribution layer. Although "xxx", "zzz", and the like are redundantly described in some items, they do not indicate the same value.

Referring again to FIG. 6. The distribution server 3 receives the Contents.zip file, the Licence.zip file, the DL metadata, and the RP metadata from the PKG generation server 2 (S13). The Licence.zip file is different for each vehicle, but other files and data are common to the vehicle model. Next, the distribution server 3 stores the Contents.zip file, the DL metadata, and the RP metadata in a server connected to the CDN 21 (S14).

Then, at the timing of receiving the notification for synchronizing the vehicle configuration information from the OTA master 22, it is specified from the VIN that the corresponding vehicle is the distribution target of the paid content (S15). The vehicle configuration information is identification information related to hardware and software of an ECU mounted on the vehicle, and also includes identification information on a system configuration including a plurality of ECUs and identification information on a vehicle configuration including a plurality of systems. The "notification for synchronization" is a notification made to match, that is, synchronize the content of the configuration information held on the vehicle side with the content of the configuration information held on the OTA center 1 side.

For example, the OTA master 22 checks the elapsed time after synchronizing the vehicle configuration information with the OTA center 1 at the timing when the ignition is turned on, and determines that synchronization of the vehicle configuration information with the OTA center 1 is necessary when a predetermined period has elapsed. Alternatively, the OTA master 22 checks whether a push notification is received from the OTA center 1, and if a push notification is received, determines that synchronization of the vehicle configuration information with the OTA center 1 is necessary. In these cases, the ECU mounted on the vehicle is requested to transmit the vehicle configuration information to the OTA master 22. The OTA master 22 notifies the OTA center 1 of the collected vehicle configuration information.

The OTA center 1 is notified of the ID of the paid content purchased by the user and the VIN of the corresponding vehicle from the billing processing center 33 and stores the ID and the VIN. In addition, the VIN of the vehicle whose software other than the paid content, also referred to as the non-paid content, is to be the target of software update is notified from an OEM server (not shown) and stored.

In S15, based on the VIN, it is determined whether (1) the non-paid content is updated, (2) the paid content is updated, (3) the paid content is updated and the non-paid content is updated, or (4) there is no update. In the present disclosure, only a case where the paid content is updated will be described.

When a campaign notification, which is information regarding program updates to be displayed on the vehicle-side system 23 or the smartphone of the user, is distributed to the target vehicle, URI information of the DL metadata and the RP metadata is embedded in the notification (S16). When there is access from the target vehicle, the Licence.zip file is transmitted to the vehicle (S17). The user key Ku and the content key Kc may be erased in step S14, for example.

Figure 11:
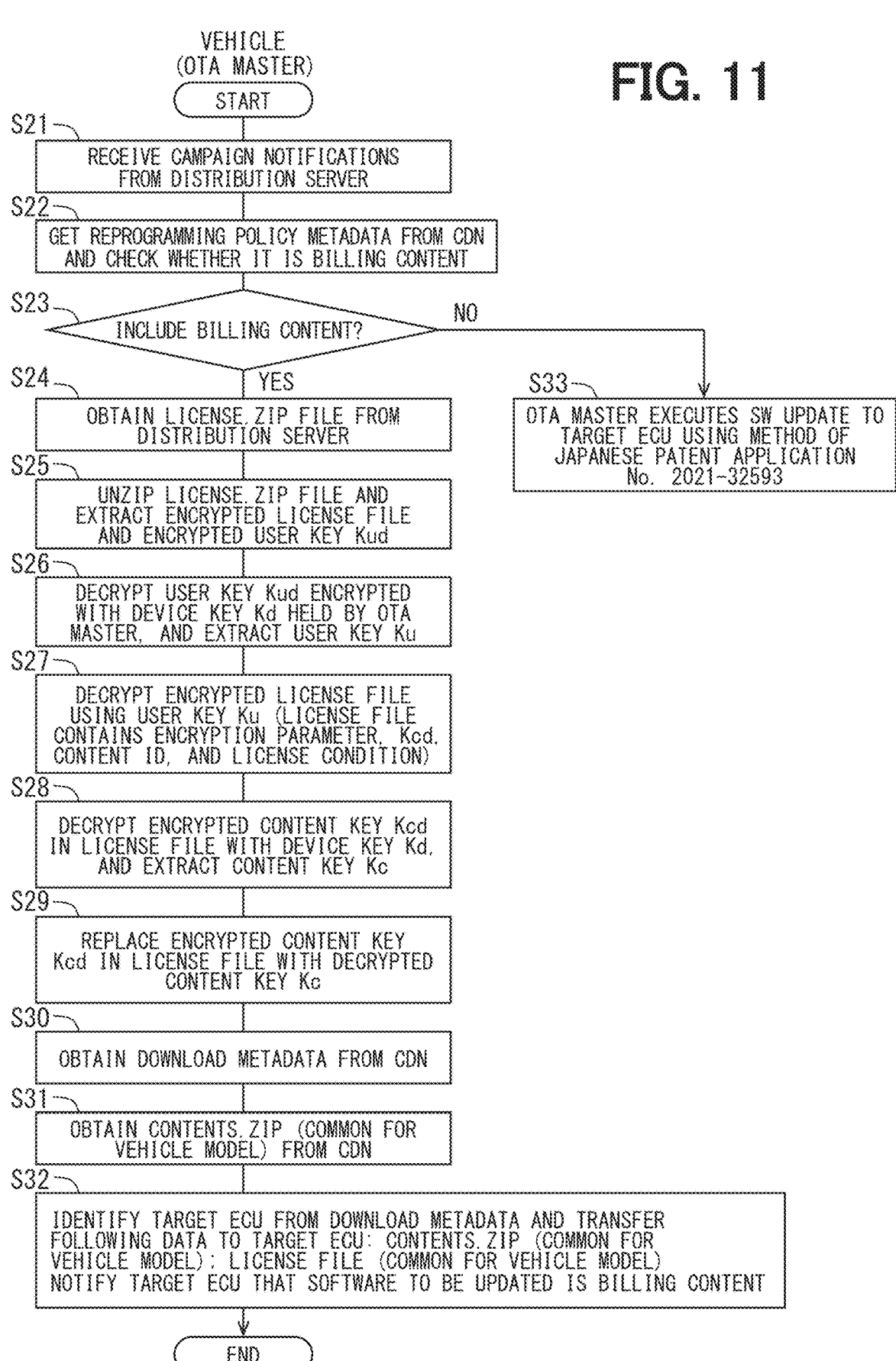
FIG. 11 is a flowchart showing processing performed by the OTA master.

As shown in FIG. 11, when receiving the campaign notification from the distribution server 3 of the OTA center 1 (S21), the OTA master 22 acquires the RP metadata from the CDN 21 according to the URI information described in the campaign notification and checks whether the paid content is included in the package scheduled to be distributed (S22). If the paid content is not included (S23; NO), the OTA master 22 performs software updates on the target ECU 24 according to the method disclosed in Japanese Patent Application No. 2021-32593, for example (S33). The contents of Japanese Patent Application No. 2021-32593 are incorporated by reference as descriptions of technical elements in this specification.

On the other hand, if the paid content is included (S23; YES), the Licence.zip file is acquired from the distribution server 3 (S24), and when the Licence.zip file is unpacked, the encrypted license file and user key Kud are extracted (S25). The user key Kud is decrypted using the device key Kd held by the OTA master 22, and the user key Ku is extracted (S26). Then, the encrypted license file is decrypted using the user key Ku (S27).

Next, when the content key Kcd included in the license file is decrypted using the device key Kd and the content key Kc is extracted (S28), the content key Kcd in the license file is replaced with the content key Kc (S29). Here, the content key Kcd in the license file is overwritten to the content key Kc. When the DL metadata and Contents.zip file are acquired from the CDN 21 (S30, S31), a target ECU 24 which is the content distribution destination is specified from the DL metadata. The target ECU 24 is notified that the update target software is the paid content, and the Contents.zip file and the license file are transferred (S32).

Instead of step S41, reception of the Contents.zip file and the license file from the OTA master 22 may be used as a notification from the OTA master 22 that the update target software is the paid content. In this case, when receiving the Contents.zip file and the license file from the OTA master 22, the target ECU 24 determines that there is paid content and performs the processing in and after step S42.

Figure 12:
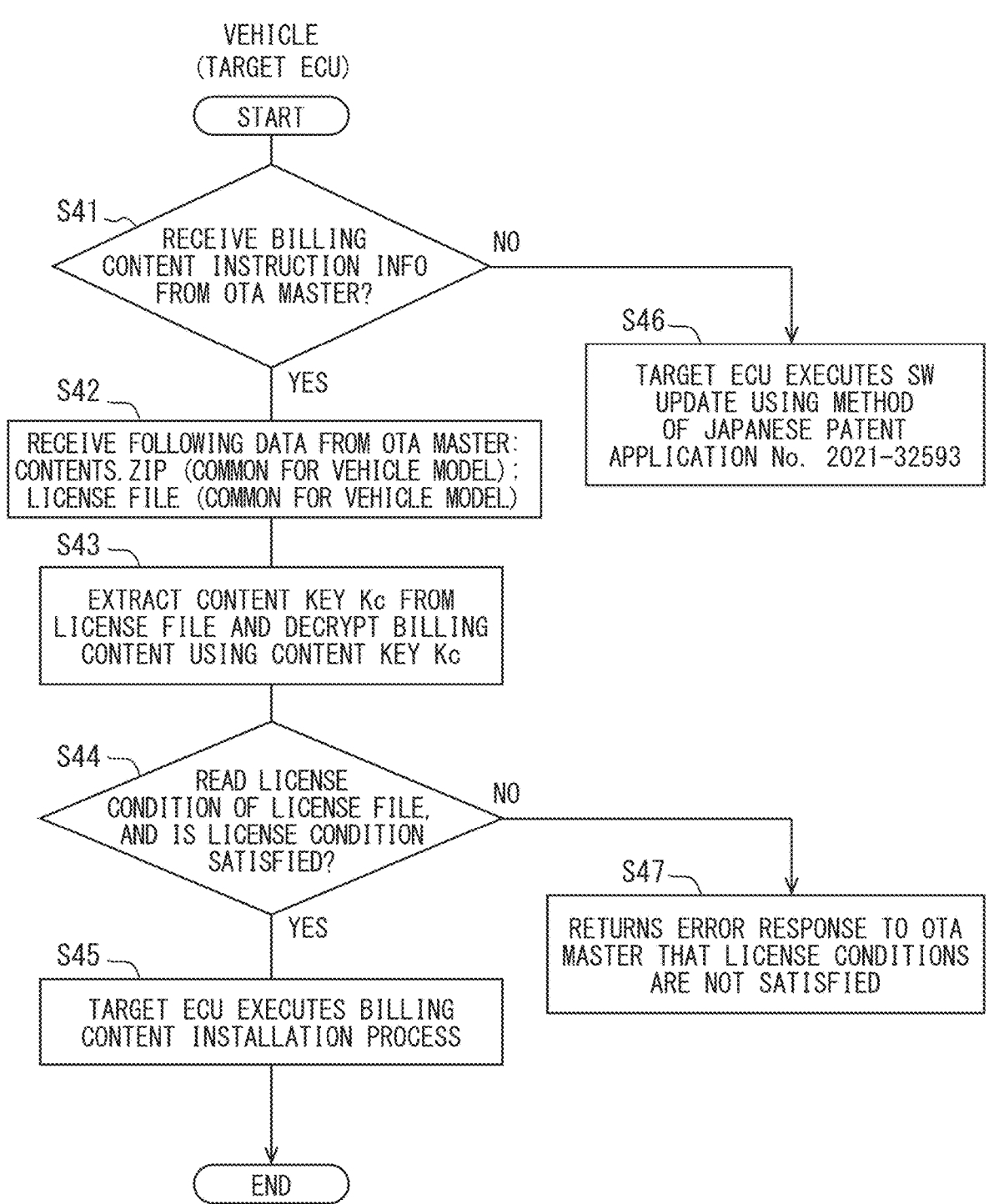
FIG. 12 is a flowchart (part 1) showing processing performed by the target ECU.

As shown in FIG. 12, the target ECU 24 determines whether a notification indicating that the update target software is the paid content has been received from the OTA master 22 (S41). If the notification is not received (NO), for example, the own software is updated according to the method disclosed in Japanese Patent Application No. 2021-32593 (S46). On the other hand, if the notification is received (S41; YES), the Contents.zip file and the license file are received from the OTA master 22 (S42). The content key Kc is extracted from the license file, and the paid content is decrypted using the content key Kc (S43).

Next, the license condition included in the license file is read, and it is determined whether the condition is satisfied (S44). If the license condition is satisfied (YES), the installation processing of the paid content is executed (S45). If the license condition is not satisfied (NO), an error response indicating that the license condition is not satisfied is returned to the OTA master 22 (S47). The license condition is, for example, that the billing processing is completed, the use period of the paid content, the remaining number of uses, and the like. The number of license conditions may be one or plural. When there are a plurality of license conditions, it is required that all the license conditions are satisfied. However, if at least one license condition is satisfied, the paid content may be used.

Figure 13:
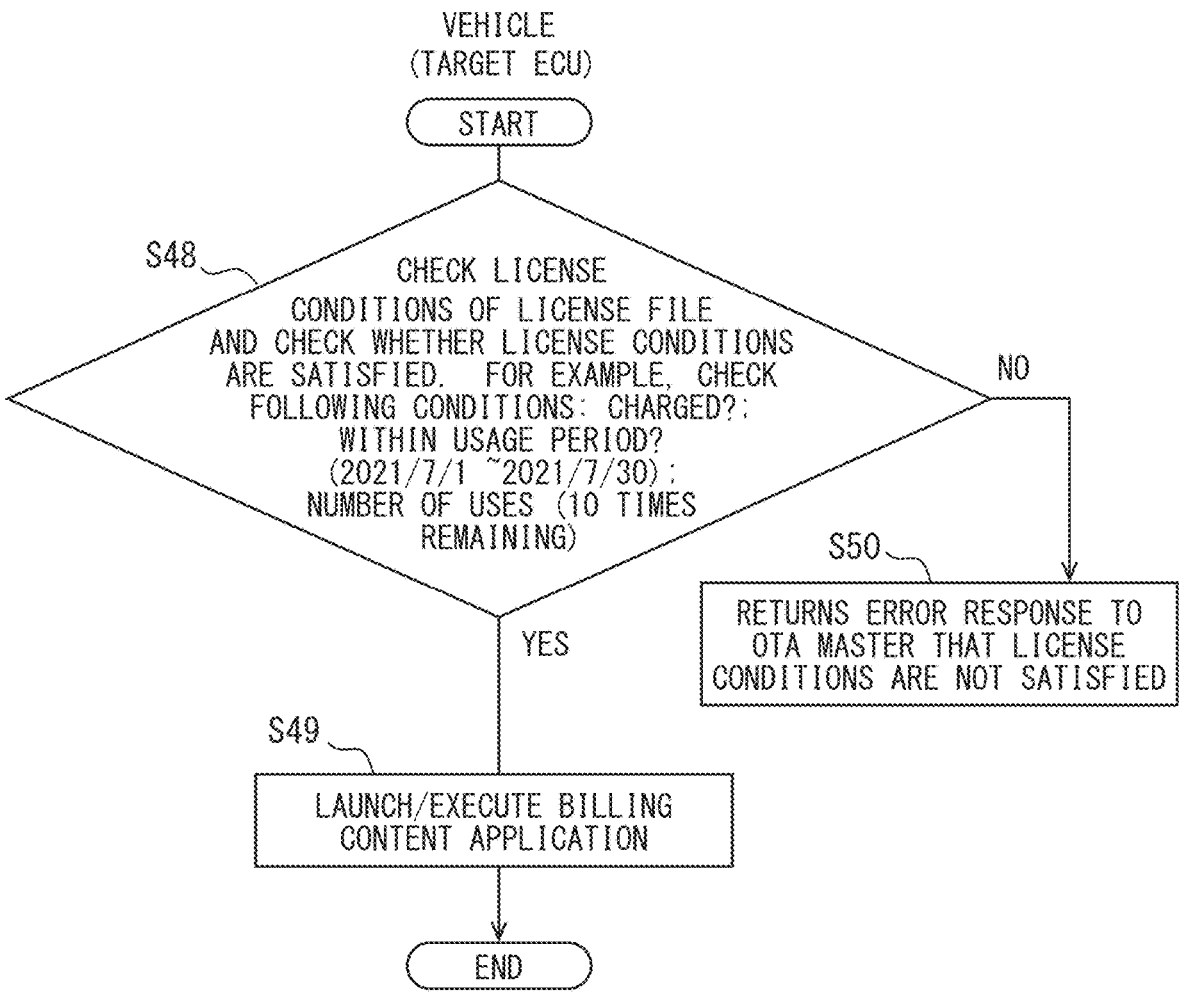
FIG. 13 is a flowchart (part 2) showing processing performed by the target ECU.

As shown in FIG. 13, when starting an application of the installed paid content, the target ECU 24 checks whether the license condition is satisfied at that time (S48). If the license condition is satisfied (YES), the application is started and executed as it is (S49). If the license condition is not satisfied (NO), the same processing as that in step S47 is performed (S50).

For the convenience of description, one target ECU 24 has been used. However, when a plurality of target ECUs 24 are used, similar processing only needs to be performed for each target ECU 24. The same applies to the subsequent embodiments. When a plurality of target ECUs 24 are used, information related to the plurality of target ECUs 24 is described in the RP metadata and the DL metadata.

As described above, according to the present embodiment, in the OTA center 1, the content key generation function section 5 generates the content key Kc for protecting the paid content, and the user key generation function section 6 generates the user key Ku corresponding to the user of the paid content. The content encryption section encrypts the content using the content key Kc, and the content key encryption function section 10 encrypts the content key Kc using the device key Kd corresponding to each vehicle. The file encryption function section 8 encrypts the license file including at least a condition for using the paid content using the user key Ku. The content key Kc and the user key Ku are erased without being stored in the OTA center 1.

With this configuration, since the OTA center 1 only needs to manage the device keys Kd corresponding to the respective vehicles, the number of keys to be managed is reduced. In addition, the paid content is protected by the content key Kc, and in order to use the content key Kc, the user key Ku associated with the user of the content and the device key Kd associated with each vehicle are required, so that the paid content is protected by the triple keys. When the paid content is used on the vehicle side, a procedure satisfying the use condition only needs to be performed in advance, and necessary decryption only needs to be sequentially performed on the vehicle side using the device key Kd.

Therefore, the OTA center 1 can flexibly and reliably protect the paid content. In addition, by using the license file, it is possible to flexibly set a condition for using the content. In addition, on the vehicle side, even if communication with the OTA center 1 is not possible, it is possible to use the content by acquiring the content via a smartphone, for example. In addition, since encrypting the user key Kc using the device key Kd, the user key encryption function section 11 can further improve the content protection level.

The license file includes a license condition for using the paid content, a content key Kc encrypted using the device key Kd, and an ID of the paid content. Accordingly, when the license file is decrypted using the user key Ku, the license condition for using the paid content can be checked. When the content key Kc is decrypted using the device key Kd after the license condition is satisfied, the paid content can be decrypted using the key Kc. Furthermore, since the license file includes the encryption parameter, detailed information regarding encryption performed using each key can be obtained from the license file.

In addition, when receiving the Licence.zip file, the unpack function section 26 of the OTA master 22 unpacks the file and extracts the encrypted license file and user key Kud. The user key decryption function section 28 decrypts the user key Ku from the user key Kud using the device key Kd. The license file decryption function section 27 decrypts the license file using the user key Ku. The content key decryption function section 29 decrypts the content key Kc included in the license file using the device key Kd. When the Contents.zip file is received, the license file including the file and the content key Kc is transferred to the target ECU 24.

The target ECU 24 decrypts the paid content using the content key Kc. Accordingly, necessary decryption is performed on the vehicle system 23 side, and the paid content can be used in the target ECU 24.

It is also conceivable that the vehicle-side system supports Software OTA (SOTA). In the SOTA, for example, in a state where a plurality of applications such as a navigation application (ver 1.0), a game application (ver 2.0), and a video application (ver 3.5) are installed on one ECU, each application can be updated individually. For example, when the paid content application is an agent service application (ver 1.0), only the agent application (ver 1.0→ver 2.0) can be updated for only the billing user.

Whether the license file has been falsified may be checked according to the attribute such as the economic value of the paid content. A falsification check may be performed on the license file. Alternatively, a falsification check may be performed on some items such as license conditions of the license file. For example, in the OTA center 1, the MAC value is calculated from the data to be falsification checked, and the calculated MAC value is input together with the license file or in the license file. Also in the target ECU 24, by calculating a MAC value and comparing the calculated MAC value with a MAC value provided from the OTA center 1, whether the falsification has been made may be checked. Accordingly, it is possible to avoid a situation in which a malicious third party falsifies the license condition and the paid content can be used despite the license condition being not satisfied.

By combining the method of the present embodiment and the SOTA, for example, the following can be achieved. Let a vehicle A subscribe to contents A and B, and a vehicle B subscribe to a content C. When a package is generated in the OTA center, let content A (navigation application), content B (game application), and content C (video application) be integrated into one package. At this time, the contents A to C are encrypted using the content keys A to C, respectively.

The package is common to vehicle models, and a plurality of vehicles receive the same package via the CDN. That is, both vehicles A and B receive the same file. In the license.zip of "3. Master layer" of the DL metadata, a specification is made corresponding to the application to which the vehicle subscribes. In the case of the vehicle A, specification is made with two license.zips corresponding to the contents A and B. In the case of the vehicle B, specification is made with one license.zip corresponding to the content C. According to the DL metadata, the vehicle A obtains a license.zip of the content A and a license.zip of the content B, and the vehicle B obtains a license.zip of the content C.

Since having the user key and the device key corresponding to the vehicle A, the vehicle A acquires the content keys A and B from the license file. Since the key C is not included in the license file, the key C cannot be used even when the encrypted content C is received. On the other hand, since having the user key and the device key corresponding to the vehicle B, the vehicle B can acquire the content key C from the license file and use only the content C.

Second Embodiment

Figure 14:
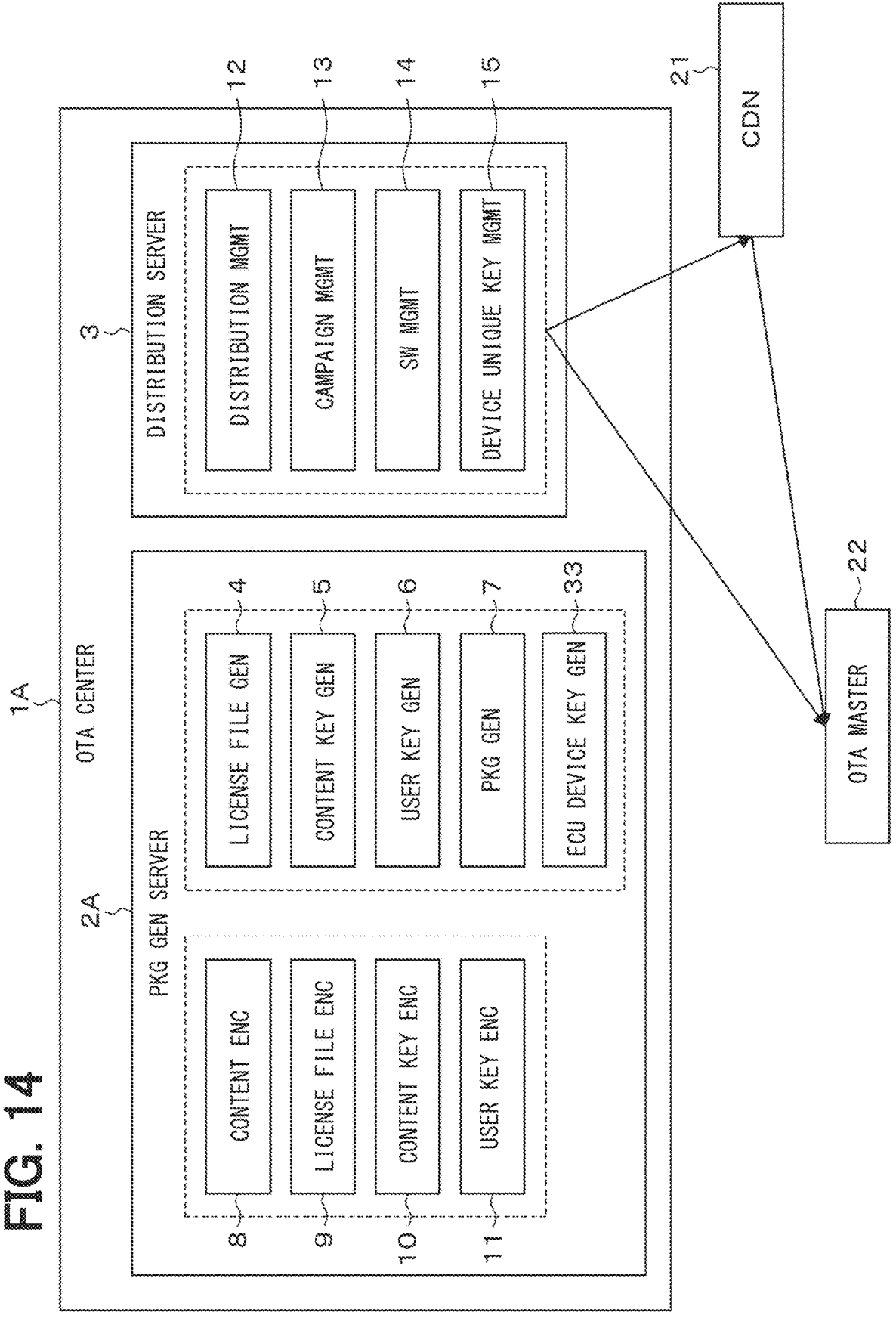
FIG. 14 is a functional block diagram mainly showing an OTA center in a second embodiment.
Figure 15:
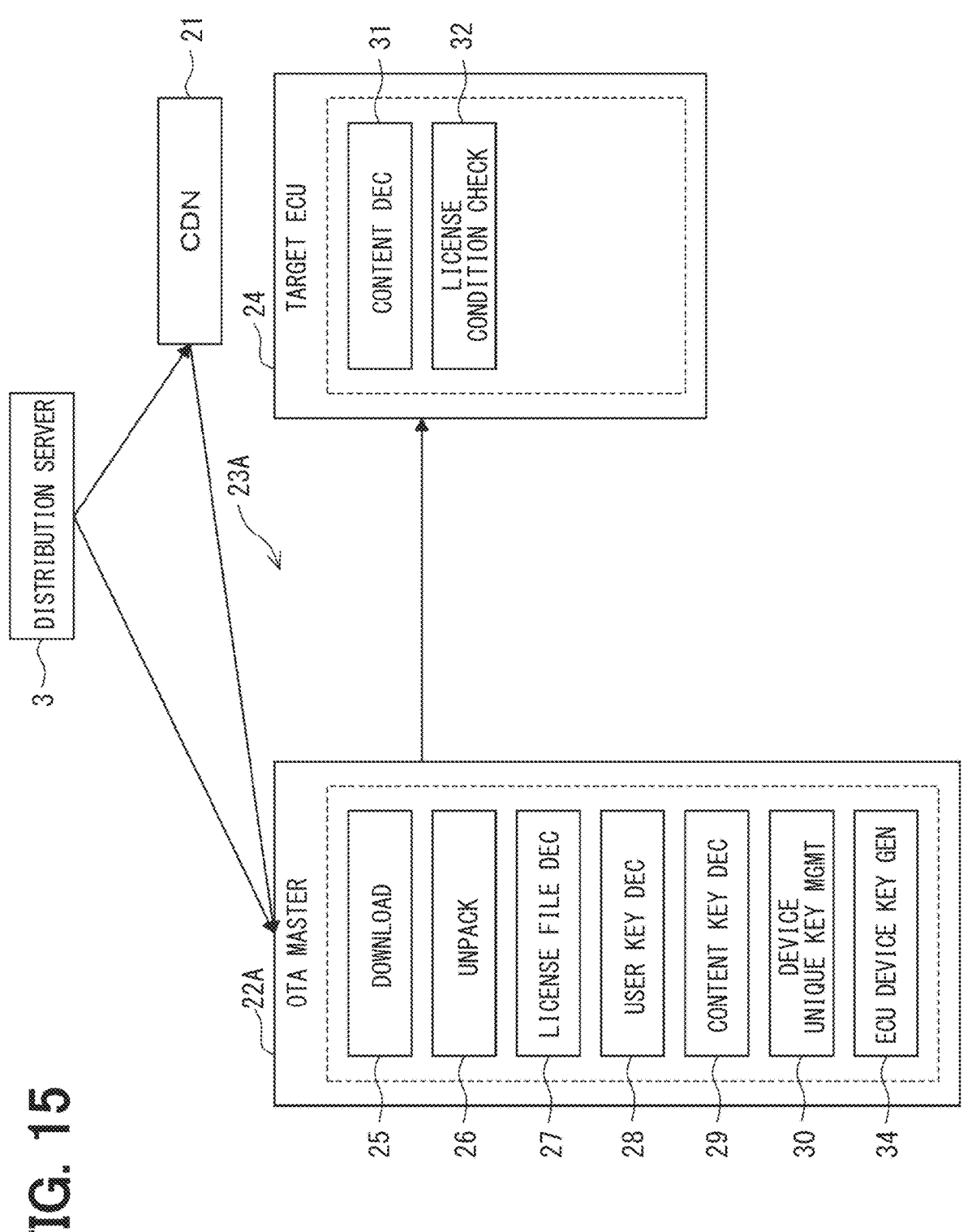
FIG. 15 is a functional block diagram mainly showing a vehicle-side system.
Figure 16:
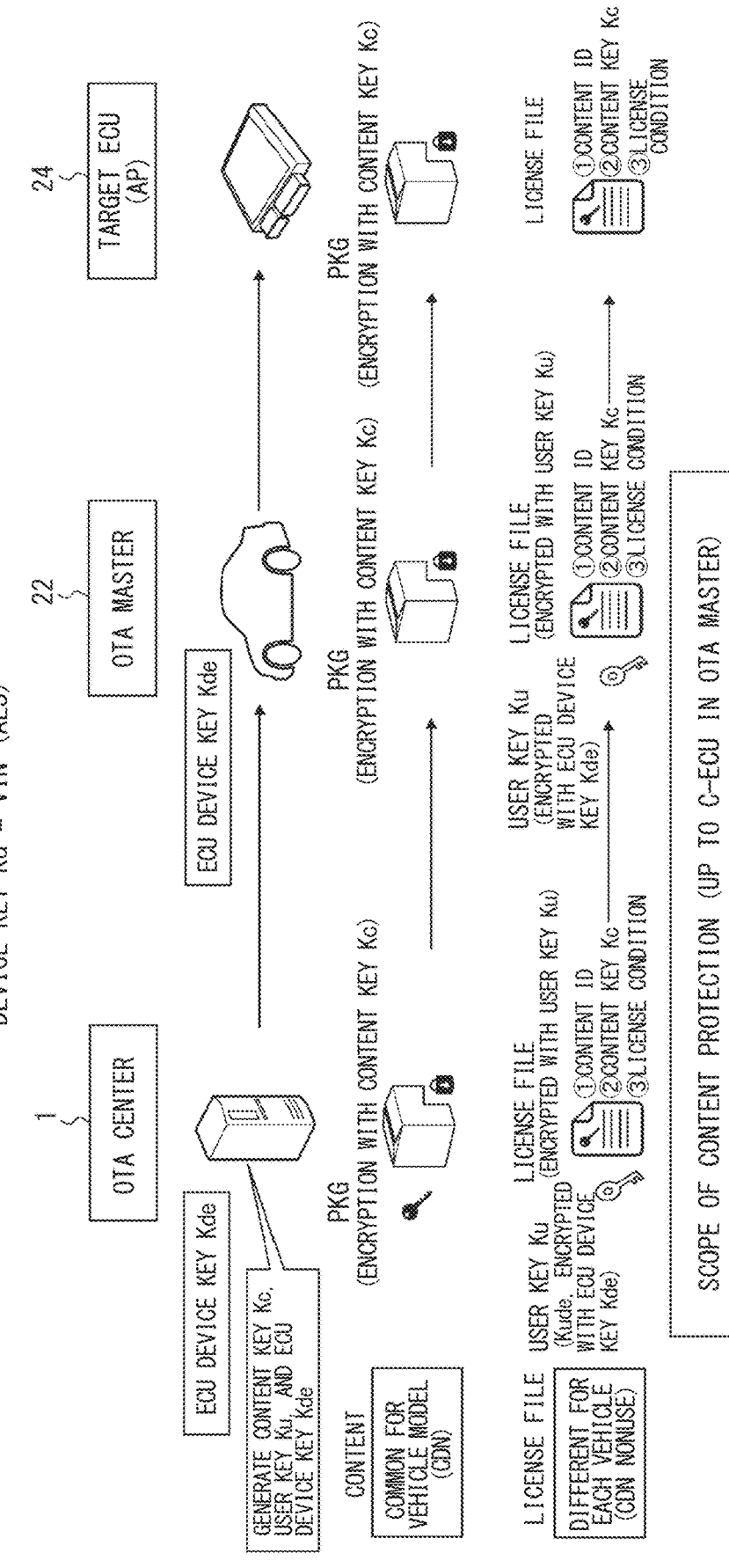
FIG. 16 is a diagram conceptually showing processing performed among an OTA center, an OTA master, and a target ECU.

Hereinafter, the same parts as those in the first embodiment will be denoted by the same reference numerals, the description thereof will be omitted, and different parts will be described. In the second embodiment, an ECU device key Kde is generated and used instead of the device key Kd. Therefore, the PKG generation server 2 of the OTA center 1A shown in FIG. 14, and the OTA master 22A shown in FIG. 15 include ECU device key generation function sections 33 and 34, respectively.

As shown in FIG. 17, when executing steps S1 to S3, the PKG generation server 2 of the OTA center 1A acquires the ID of the target ECU 24 to be updated from the DL metadata (S51). An ECU device key Kde specific to the target ECU 24 is generated by execution processing inside the PKG generation server 2 at runtime from the device key Kd and the ID of the target ECU 24 (S52).

The ECU device key Kde is generated, for example, by applying a hash function to a result obtained by adding the value of the device key Kd to the value of the ID of the target ECU 24. In addition, a hash function may be applied to a result obtained by the coupling of the values of the two, instead of addition. The ECU device key Kde corresponds to an apparatus-specific device key. Then, by encrypting the content key Kc using the ECU device key Kde, the content key Kcde is generated (S53).

As a method for generating the ECU device key Kde, for example, hard-coding also referred to as on-coding may be performed on the ECU device key generation function sections 33 and 34. In this case, one method for generating the ECU device key Kde is specified as to how to process the value of the device key Kd and the value of the ID of the target ECU 24 to apply the hash function. Alternatively, a method for generating the ECU device key Kde may be described in the item of the master layer of the RP metadata.

Subsequently, when steps S5 to S8 are executed, the user key Ku is encrypted using the ECU device key Kde, and a user key Kude is generated (S54). The encrypted license file and user key Kude are archived, and a Licence.zip file is generated (S55). In step S6a, the encrypted content key is Kcde. Then, steps S11 to S17 are executed.

Figure 18:
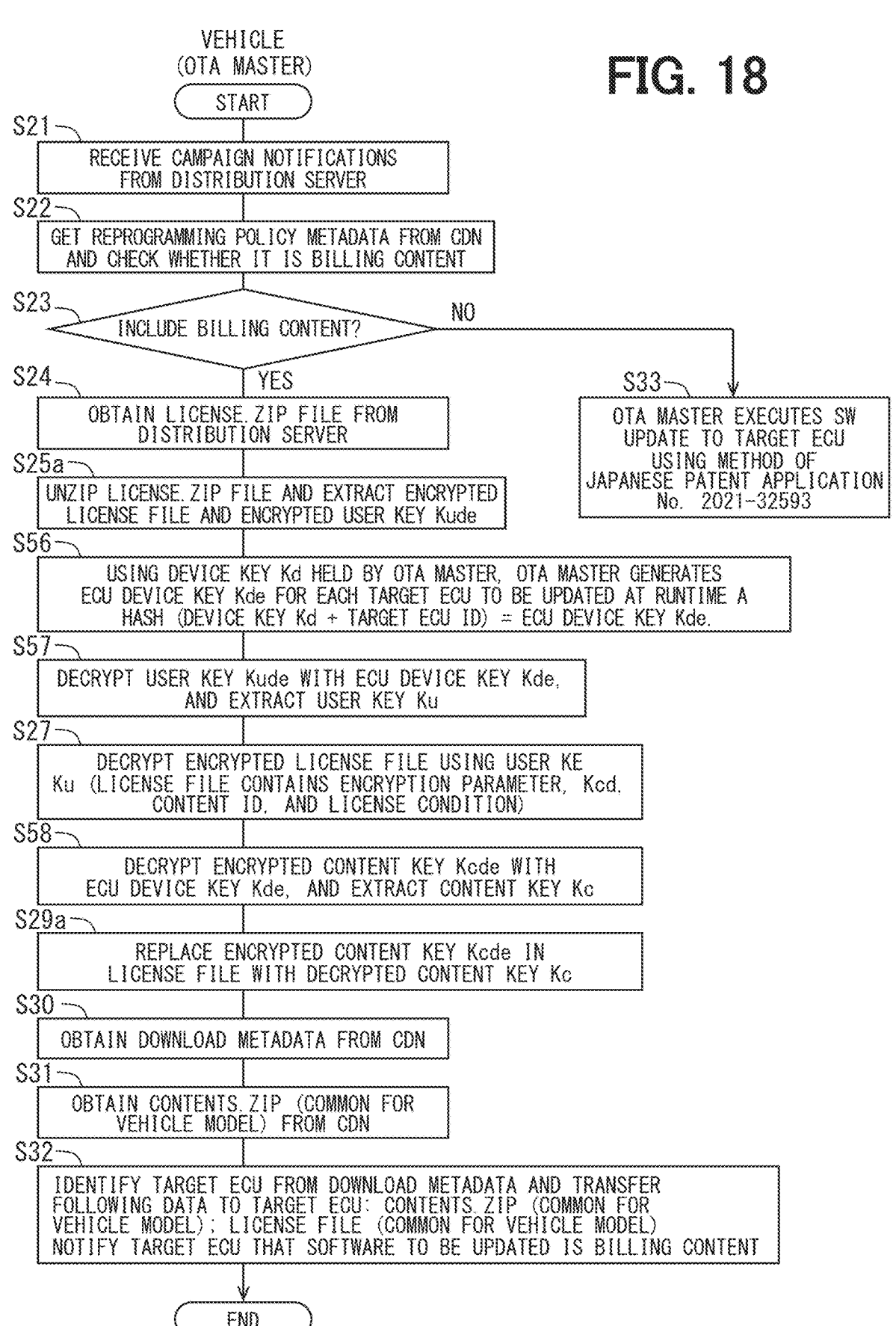
FIG. 18 is a flowchart showing processing performed by the OTA master.

As shown in FIG. 18, the OTA master 22A executes steps S21 to S25a. In step S25a, the user key to be extracted is Kude. A hash function is applied to a result obtained by adding the value of the ID of the target ECU 24 to the value of the device key Kd held by itself, and an ECU device key Kde is generated (S56). Using the ECU device key Kde, the user key Ku is decrypted and extracted from the user key Kude (S57).

Subsequently, when step S27 is executed, the encrypted content key Kcde is decrypted using the ECU device key Kde, and the content key Kc is extracted (S58). Then, steps S29a to S32 are executed. In step S29a, the content key Kcde is replaced with the content key Kc. The processing performed by the target ECU 24 is the same as that of the first embodiment.

As described above, according to the second embodiment, the ECU device key generation function section 33 of the OTA center 1A generates the ECU device key Kde based on the device key Kd and the ID of the target ECU 24. Specifically, a hash function is applied to a result obtained by adding the value of the ID of the target ECU 24 to the value of the device key Kd, or a result obtained by the coupling of the values of the two, and an ECU device key Kde is generated. Necessary encryption is performed using the ECU device key Kde instead of the device key Kd of the first embodiment. Accordingly, the OTA master 22A also generates the ECU device key Kde as with the OTA center 1A, and performs necessary decryption. As described above, by using the ECU device key Kde generated corresponding to each target ECU 24, the security level can be further improved.

Since the ECU device key Kde is generated based on the ID of the target ECU 24 and the value of the device key Kd, the OTA center 1A only needs to manage the values of the device keys Kd for the number of OTA masters 22A. In a situation where a plurality of ECUs are mounted on one vehicle, the management cost is significantly different depending on whether keys for the number of vehicles are managed or keys for the number of ECUs are managed.

Third Embodiment

Figure 19:
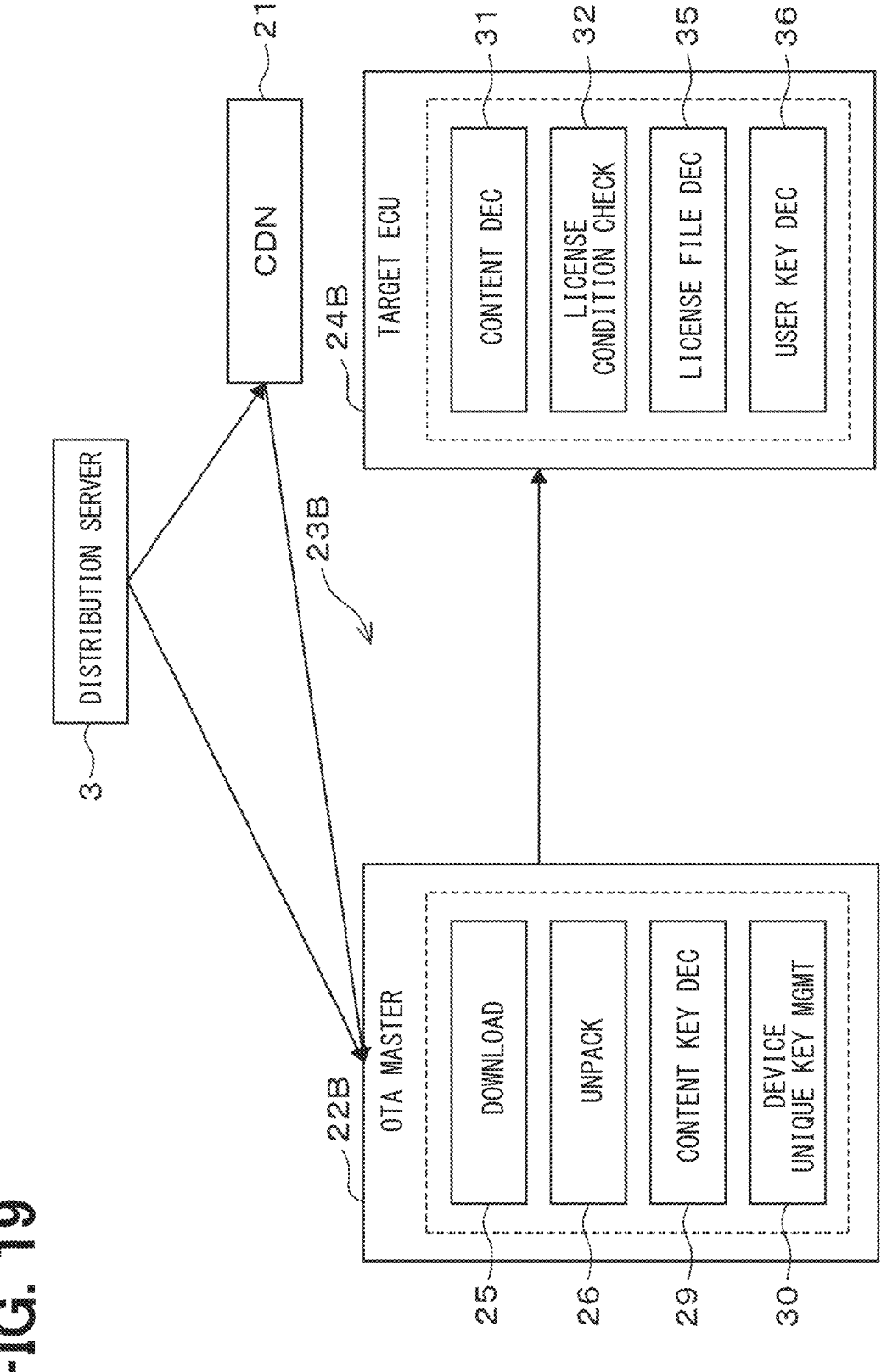
FIG. 19 is a functional block diagram mainly showing a vehicle-side system in a third embodiment.
Figure 20:
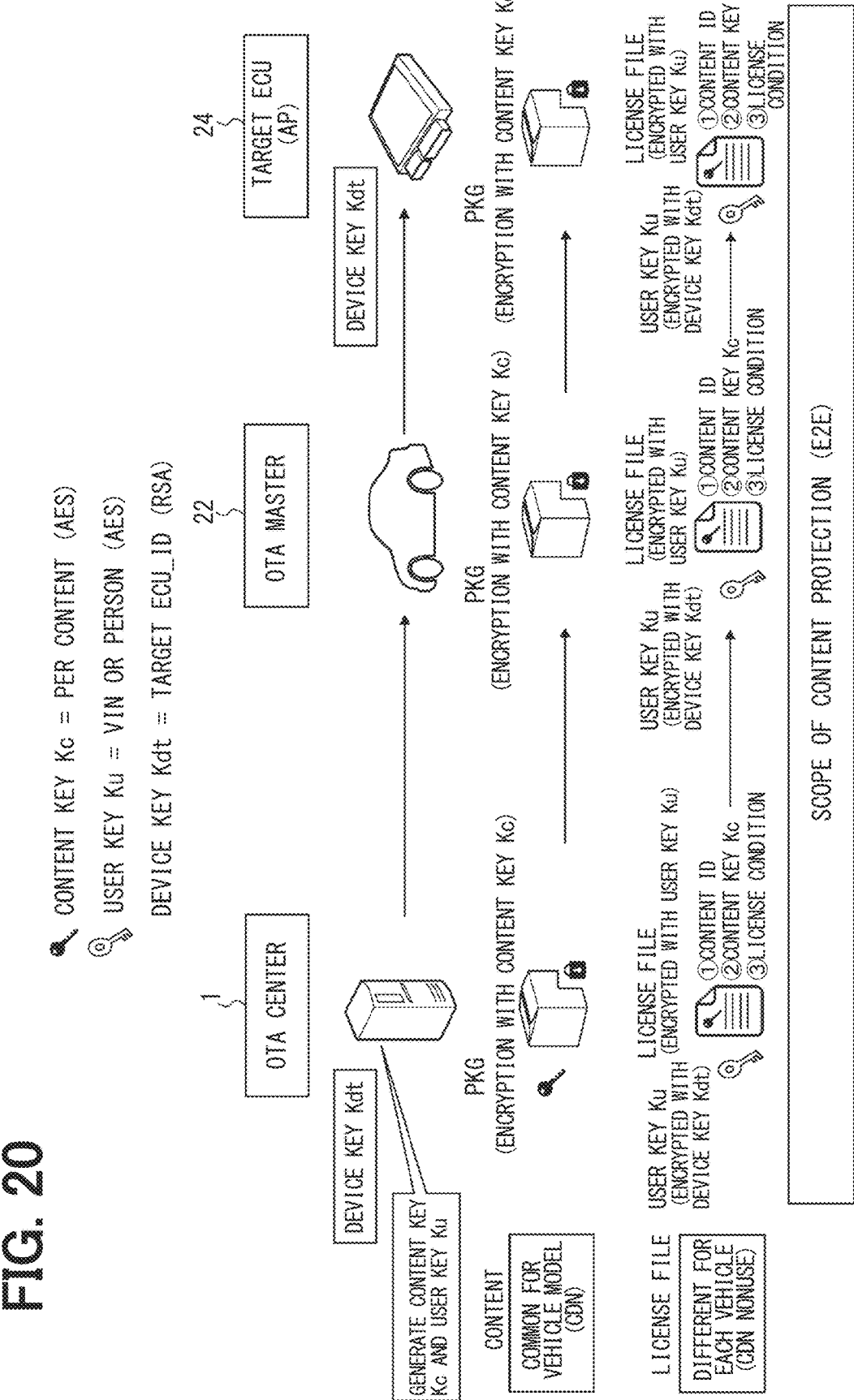
FIG. 20 is a diagram conceptually showing processing performed among an OTA center, an OTA master, and a target ECU.

In the third embodiment, a device key Kdt prepared in advance for each target ECU 24 is used instead of the device key Kd. The device key Kdt is written in each target ECU 24 in advance. In the vehicle-side system 23B shown in FIG. 19, the license file decryption function section 27 and the user key decryption function section 28 are deleted from the OTA master 22B. Instead, a license file decryption function section 35 and a user key decryption function section 36 are provided on the target ECU 24B side.

As shown in FIG. 21, when executing steps S1 and S2, the PKG generation server 2 of the OTA center 1 acquires the device key Kdt prepared for each target ECU 24 from the device unique key management function section 15 of the distribution server 2 (S61). The content key Kc is encrypted using the device key Kdt and the content key Kcdt is generated (S62).

Subsequently, steps S5 and S6b are executed. In step S6b, the content key Kcd is replaced with Kcdt. Furthermore, when steps S7 and S8 are executed, the user key Ku is encrypted using the device key Kdt and set as the user key Kudt (S63). The encrypted license file and user key Kudt are archived, and the file name is set as Licence.zip (S64). Then, steps S11 to S17 are executed.

Figure 22:
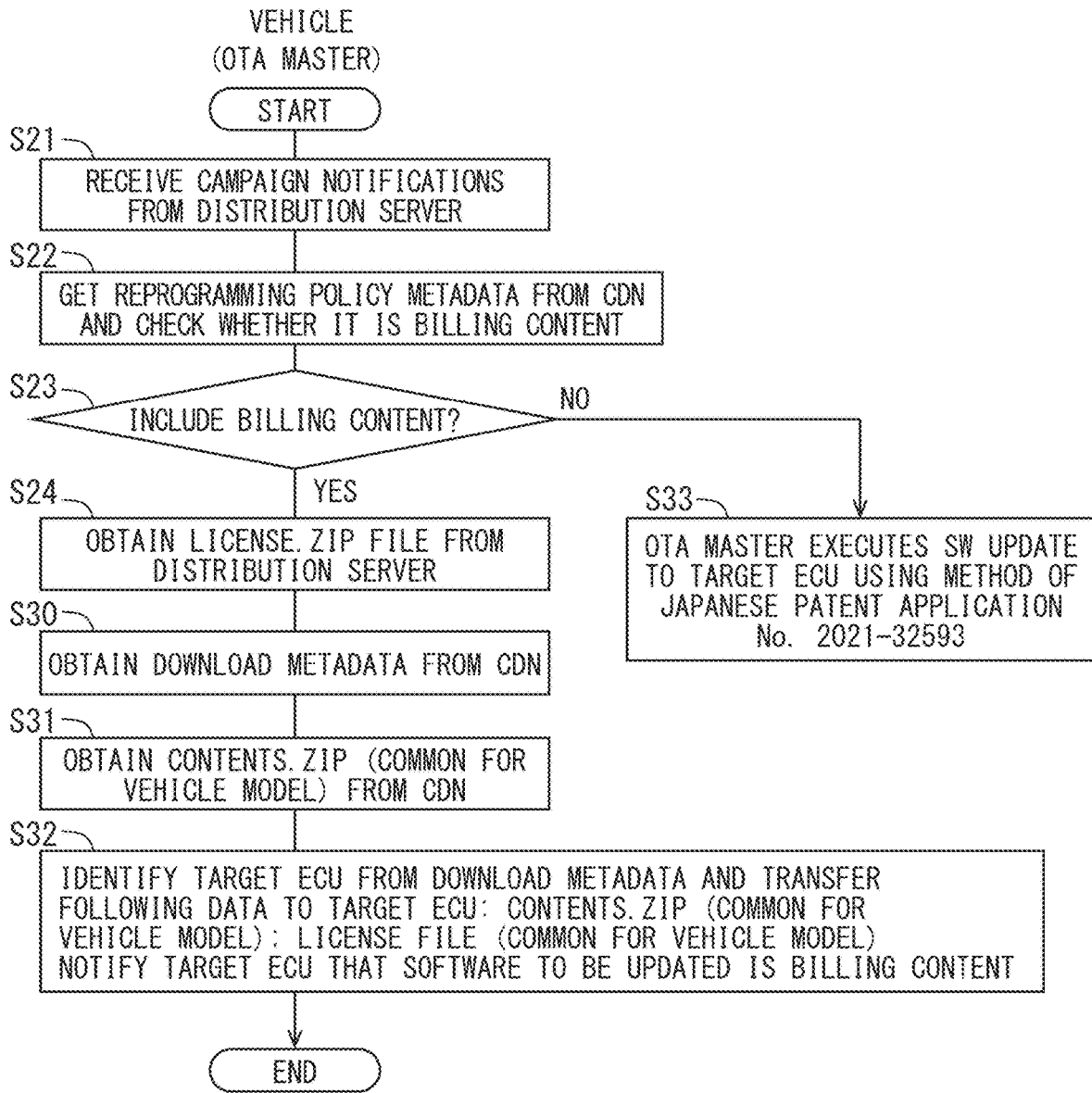
FIG. 22 is a flowchart showing processing performed by the OTA master.

As shown in FIG. 22, when executing steps S21 to S24, the OTA master 22B next executes steps S30 to S32.

Figure 23:
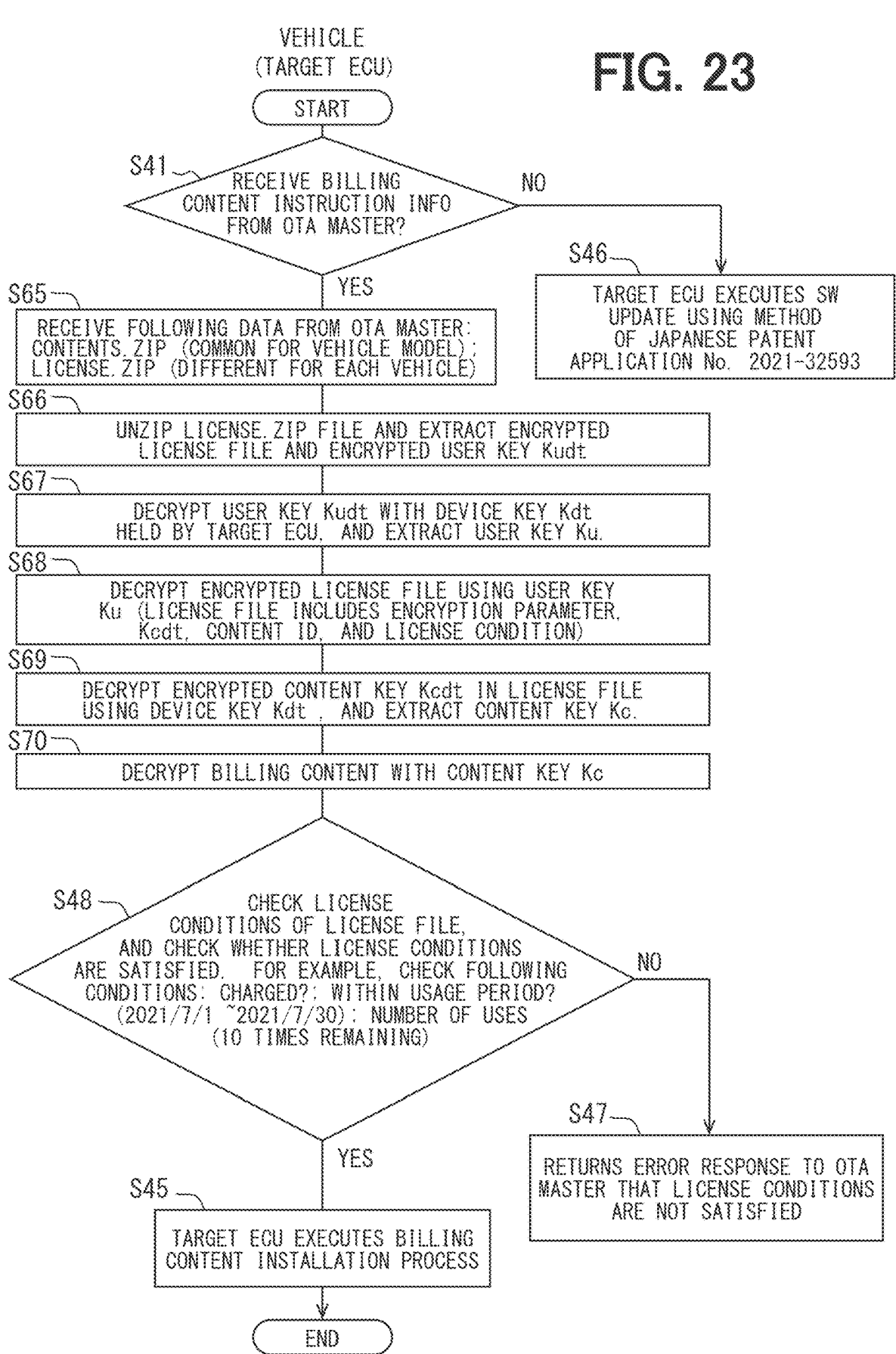
FIG. 23 is a flowchart showing processing performed by the target ECU.

As shown in FIG. 23, if receiving a notification that the update target software is the paid content from the OTA master 22B (S41; YES), the target ECU 24 receives the Contents.zip file and the Licence.zip file from the OTA master 22B (S65). When the Licence.zip file is unpacked, the encrypted license file and the user key Kudt are extracted (S66).

Next, when the user key Kudt is decrypted using the device key Kdt held by the target ECU 24 and the user key Ku is extracted (S67), the encrypted license file is decrypted using the user key Ku (S68). When the content key Kcdt is extracted from the license file and decrypted using the device key Kdt, and the content key Kc is extracted (S69), the paid content is decrypted using the content key Kc (S70).

If the license condition included in the license file is read and the condition is satisfied (S48; YES), processing of installing the paid content is executed (S45). If the license condition is not satisfied (NO), an error response indicating that the license condition is not satisfied is returned to the OTA master 22B (S47). Processing at the time of starting the application of the installed paid content is similar to that of the first embodiment.

The unpacking of the Licence.zip file performed in step S66 may be performed by the OTA master 22B, and the encrypted license file and user key Kudt may be transferred to the target ECU 24. In addition, when there are a plurality of target ECUs 24B, a license file is created for each target ECU 24B.

As described above, according to the third embodiment, the device unique key management function section 15 of the OTA center 1 holds the device key Kdt prepared for each target ECU 24. When receiving the encrypted license file and user key Kudt, the target ECU 24 decrypts a user key Ku using the device key Kdt from the user key Kudt. The license file is decrypted using the user key Ku. In addition, the content key Kc is decrypted from the content key Kcdt included in the license file using the device key Kdt. Furthermore, the encrypted paid content is decrypted using the content key Kc.

That is, since the paid content is transferred to the target ECU 24 in an encrypted state and is decrypted in the target ECU 24, the security level can be further improved.

Other Embodiments

The processing of encrypting the user key Ku using the device key Kd only needs to be performed as necessary.

The use restriction of the content is not limited to the presence or absence of billing. For example, the use of content may be restricted according to a vehicle type or a vehicle grade.

The use restriction of the content may be imposed not only when the user uses the content but also when a system or an application installed on a vehicle uses the content.

Although the present disclosure has been described in accordance with examples, it is understood that the present disclosure is not limited to the examples and structures. The present disclosure also includes various modifications and modifications within an equivalent scope. In addition, various combinations and modes, and other combinations and modes including only one element, more elements, or fewer elements are also within the scope and idea of the present disclosure.

Means and/or functions provided by each apparatus or the like can be provided by software recorded in a tangible memory device and a computer that executes the software, only software, only hardware, or a combination thereof. For example, when the control apparatus is provided by an electronic circuit that is hardware, it can be provided by a digital circuit including a large number of logic circuits, or an analog circuit.

The control section and the method thereof of the present disclosure may be implemented by a dedicated computer provided by configuring a processor and a memory programmed to execute one or more functions embodied by a computer program. Alternatively, the control section and the method thereof described in the present disclosure may be implemented by a dedicated computer provided by configuring a processor with one or more dedicated hardware logic circuits. Alternatively, the control section and the method thereof described in the present disclosure may be implemented by one or more dedicated computers configured by a combination of a processor and a memory programmed to execute one or more functions and a processor configured by one or more hardware logic circuits. In addition, the computer program may be stored in a computer-readable non-transitory tangible storage medium as an instruction executed by a computer.

What is claimed is:

1. A center apparatus comprising:

at least one processor with a memory storing computer program code executable by the at least one processor, the at least one processor configured to cause the center apparatus to implement:

a receiving section configured to receive content request from a plurality of vehicles;

a content key generation section configured to generate a content key for protecting content;

a user key generation section configured to generate a user key corresponding to a user who uses the content;

a device key management section configured to manage a device key corresponding to and unique to each vehicle;

a content encryption section configured to encrypt the content using the content key received from the content key generation section;

a license file generation section configured to generate a license file including at least a condition for using the content, a content key encryption section configured to encrypt the content key received from the content key generation section using the device key received from the device key management section; and a file encryption section configured to encrypt the license file using the user key received from the user key generation section;

an apparatus-specific device key generation section configured to generate an apparatus-specific device key based on the device key received from the device key management section and identification information of a target apparatus, the target apparatus being an electronic control apparatus arranged in each vehicle and serving as a transfer destination of the content;

a user key encryption section configured to encrypt the user key based on the apparatus-specific key; and a transmission section configured to transmit the encrypted content, the encrypted license file, and the encrypted user key to each vehicle in response to the content request.

2. The center apparatus according to claim 1, wherein the at least one processor is further configured to cause the center apparatus to implement:

a user key encryption section configured to encrypt the user key using the device key.

3. The center apparatus according to claim 1, wherein the license file includes a license condition for using the content, a content key encrypted using the device key, and identification information for identifying the content.

4. The center apparatus according to claim 3, wherein the license file includes an encryption parameter that is information for performing encryption.

5. The center apparatus according to claim 1, wherein the at least one processor is further configured to cause the center apparatus to implement:

a package generation section configured to generate a distribution package to be transmitted to a vehicle, wherein the package generation section also functions as the content key generation section, the user key generation section, the content encryption section, the content key encryption section, and the file encryption section.

6. The center apparatus according to claim 1, wherein the at least one processor is further configured to cause the center apparatus to implement:

a compressed file generation section configured to generate a compressed file including the encrypted license file and the user key.

7. The center apparatus according to claim 1, wherein the at least one processor is further configured to implement:

a content distribution section configured to distribute encrypted content to a vehicle via a contents delivery network.

8. The center apparatus according to claim 1, wherein the device key management section holds the device key for each vehicle identification information assigned to each vehicle.

9. The center apparatus according to claim 1, wherein the device key generation section generates the apparatus-specific device key by applying a hash function to a result obtained by adding a value of the identification information to a value of a device key held for each piece of the vehicle identification information.

10. The center apparatus according to claim 1, wherein the device key generation section generates the apparatus-specific device key by applying a hash function to data obtained by coupling a device key held for each piece of the vehicle identification information and the identification information.

11. The center apparatus according to claim 1, wherein the device key management section holds the device key for each target apparatus which is an electronic control apparatus arranged in each vehicle and which is a transfer destination of the content.

12. A content protection method comprising, wherein the method is implemented by a center apparatus:

receive content request from a plurality of vehicles;

generating a content key for protecting content;

generating a user key corresponding to a user who uses the content;

encrypting the content using the generated content key;

encrypting the generated content key using a device key corresponding to and unique to each vehicle;

generate a license file including at least a condition for using the content;

encrypting the license file using the generated user key;

generating an apparatus-specific device key based on the device key and identification information of a target apparatus, the target apparatus being an electronic control apparatus arranged in each vehicle and serving as a transfer destination of the content;

encrypt the user key based on the apparatus-specific key; and transmit the encrypted content, the encrypted license file, and the encrypted user key to each vehicle in response to the content request.

13. The content protection method according to claim 12, further comprising encrypting the user key using the device key.

14. The content protection method according to claim 12, wherein the license file includes a license condition for using the content, a content key encrypted using the device key, and identification information for identifying the content.

15. The content protection method according to claim 14, wherein the license file further includes an encryption parameter that is information for performing encryption.

16. The content protection method according to claim 12, further comprising generating a compressed file including the encrypted license file and the user key.

17. The content protection method according to claim 12, further comprising distributing encrypted content to a vehicle via a contents delivery network.

18. The content protection method according to claim 12, wherein the device key is held for each vehicle identification information assigned to each vehicle.

19. The content protection method according to claim 18, further comprising generating an apparatus-specific device key based on a device key held for each piece of the vehicle identification information, and identification information of a target apparatus which is an electronic control apparatus arranged in each vehicle and which is a transfer destination of the content.

20. The content protection method according to claim 19, further comprising generating the apparatus-specific device key by applying a hash function to a result obtained by adding a value of the identification information to a value of a device key held for each piece of the vehicle identification information.

21. The content protection method according to claim 19, further comprising generating the apparatus-specific device key by applying a hash function to data obtained by coupling a device key held for each piece of the vehicle identification information and the identification information.

22. The content protection method according to claim 12, wherein the device key is held for each target apparatus which is an electronic control apparatus arranged in each vehicle and which is a transfer destination of the content.

23. A non-transitory computer readable storage medium storing a content protection program executed by a computer included in a center apparatus that communicates with a vehicle and distributes content, the content protection program comprising instructions to cause the computer to:

receive content request from a plurality of vehicles;

generate a content key for protecting content;

generate a user key corresponding to a user who uses the content;

encrypt the content using the generated content key;

encrypt the generated content key using a device key corresponding to and unique to each vehicle;

generate a license file including at least a condition for using the content;

encrypt the license file using the user key;

generate an apparatus-specific device key based on the device key and identification information of a target apparatus, the target apparatus being an electronic control apparatus arranged in each vehicle and serving as a transfer destination of the content;

encrypt the user key based on the apparatus-specific key; and transmit the encrypted content, the encrypted license file, and the encrypted user key to each vehicle in response to the content request.

24. The non-transitory computer readable storage medium storing the content protection program according to claim 23, the content protection program further comprising causing a computer to encrypt the user key using the device key.

25. The non-transitory computer readable storage medium storing the content protection program according to claim 24, the content protection program further comprising causing the license file to include a license condition for using the content, a content key encrypted using the device key, and identification information for identifying the content.

26. The non-transitory computer readable storage medium storing the content protection program according to claim 25, the content protection program further comprising causing the license file to include an encryption parameter that is information for performing encryption.

27. The non-transitory computer readable storage medium storing the content protection program according to claim 23, the content protection program further comprising causing a computer to generate a compressed file including the encrypted license file and the user key.

28. The non-transitory computer readable storage medium storing the content protection program according to claim 23, the content protection program further comprising causing a computer to distribute encrypted content to a vehicle via a contents delivery network.

29. The non-transitory computer readable storage medium storing the content protection program according to claim 23, wherein the device key is held for each vehicle identification information assigned to each vehicle.

30. The non-transitory computer readable storage medium storing the content protection program according to claim 29, the content protection program further comprising causing a computer to generate an apparatus-specific device key based on a device key held for each piece of the vehicle identification information, and identification information of a target apparatus which is an electronic control apparatus arranged in each vehicle and which is a transfer destination of the content.

31. The non-transitory computer readable storage medium storing the content protection program according to claim 30, the content protection program further comprising causing a computer to generate the apparatus-specific device key by applying a hash function to a result obtained by adding a value of the identification information to a value of a device key held for each piece of the vehicle identification information.

32. The non-transitory computer readable storage medium storing the content protection program according to claim 30, the content protection program further comprising causing a computer to generate the apparatus-specific device key by applying a hash function to data obtained by coupling a device key held for each piece of the vehicle identification information and the identification information.

33. The non-transitory computer readable storage medium storing the content protection program according to claim 23, wherein the device key is held for each target apparatus which is an electronic control apparatus arranged in each vehicle and which is a transfer destination of the content.

* * * * *